US006855180B1

(12) United States Patent
Pinatti et al.

(10) Patent No.: US 6,855,180 B1
(45) Date of Patent: Feb. 15, 2005

(54) CATALYTIC CELLULIGNIN FUEL

(75) Inventors: Daltro Garcia Pinatti, Lorena (BR); Christian Alexandre Vieira, Campinas (BR); Alvaro Guedes Soares, Mogim Mirim (BR)

(73) Assignee: RM Materiais Refratarios Ltda. (BR)

( * ) Notice: Subject to any disclaimer, the term of this patent is extended or adjusted under 35 U.S.C. 154(b) by 110 days.

(21) Appl. No.: 10/018,362

(22) PCT Filed: Jun. 23, 2000

(86) PCT No.: PCT/BR00/00066

§ 371 (c)(1),
(2), (4) Date: May 8, 2002

(87) PCT Pub. No.: WO00/78899

PCT Pub. Date: Dec. 28, 2000

(30) Foreign Application Priority Data

Jun. 23, 1999 (BE) .......................................... 9902606-6

(51) Int. Cl.[7] .............................................. C10L 5/00
(52) U.S. Cl. ....................................................... 44/307
(58) Field of Search .......................... 44/307, 530, 589, 44/590, 605, 606, 628; 127/1, 37, 42; 435/161

(56) References Cited

U.S. PATENT DOCUMENTS

| 4,235,968 A | * | 11/1980 | Pilipski ........................ 435/161 |
| 4,384,897 A | | 5/1983 | Brink ............................ 127/37 |
| 4,427,453 A | * | 1/1984 | Reitter ............................ 127/1 |
| 4,706,903 A | | 11/1987 | Brink et al. ................. 241/188 |
| 4,708,746 A | * | 11/1987 | Hinger ......................... 127/37 |
| 5,221,357 A | | 6/1993 | Brink ............................ 127/43 |
| 5,338,366 A | | 8/1994 | Grace et al. .................. 127/37 |
| 5,340,403 A | | 8/1994 | Fields et al. .................. 127/37 |
| 5,366,558 A | | 11/1994 | Brink ............................ 127/43 |
| 5,395,455 A | * | 3/1995 | Scott et al. .................... 127/37 |
| 5,424,417 A | * | 6/1995 | Torget et al. ................. 536/56 |
| 5,430,403 A | | 7/1995 | Moyer et al. ................. 127/37 |
| 5,503,996 A | * | 4/1996 | Torget et al. ............... 435/105 |
| 5,536,325 A | | 7/1996 | Brink ............................ 127/43 |
| 5,597,714 A | * | 1/1997 | Farone et al. ............... 435/100 |
| 5,628,830 A | | 5/1997 | Brink ............................ 127/36 |
| 5,705,369 A | * | 1/1998 | Torget et al. ............... 435/105 |
| 6,409,841 B1 | * | 6/2002 | Lombard ...................... 127/37 |
| 6,423,145 B1 | * | 7/2002 | Nguyen et al. ............... 127/37 |

FOREIGN PATENT DOCUMENTS

| EP | 0 265 111 | 4/1988 |
| GB | 1 569 138 | 6/1980 |
| WO | WO 00/78446 | 12/2000 |

OTHER PUBLICATIONS

Resolution CONAMA No. 20 of Jun. 1986, published in the D.O.U. (Official Gazette) of Jul. 30, 1986.
U.S. Appl. No. 10/018,360, filed Dec. 19, 2001.
Alireza Esteghlalian, et al., "Modeling and Optimization of the Dilute–Sulfuric–Acid Pretreatment of Corn Stover, Poplar and Switchgrass", Bioresource Technology, vol. 59 *1997), pp. 129–136.

* cited by examiner

Primary Examiner—Cephia D. Toomer
(74) Attorney, Agent, or Firm—Smith, Gambrell & Russell, LLP

(57) ABSTRACT

A catalytic cellulignin fuel obtained by a biomass prehydrolysis process and that is composed of cellulose and globulized lignin with a specific surface of about 1.5–2.5 $m^2/g$. The cellulignin fuel may be ground down to particles smaller than 250 $\mu m$ and has a combustion heat value that can reach up to 18–20 MJ/kg and an ignition time equal to or shorter than 20 ms (0.02 s).

8 Claims, 11 Drawing Sheets

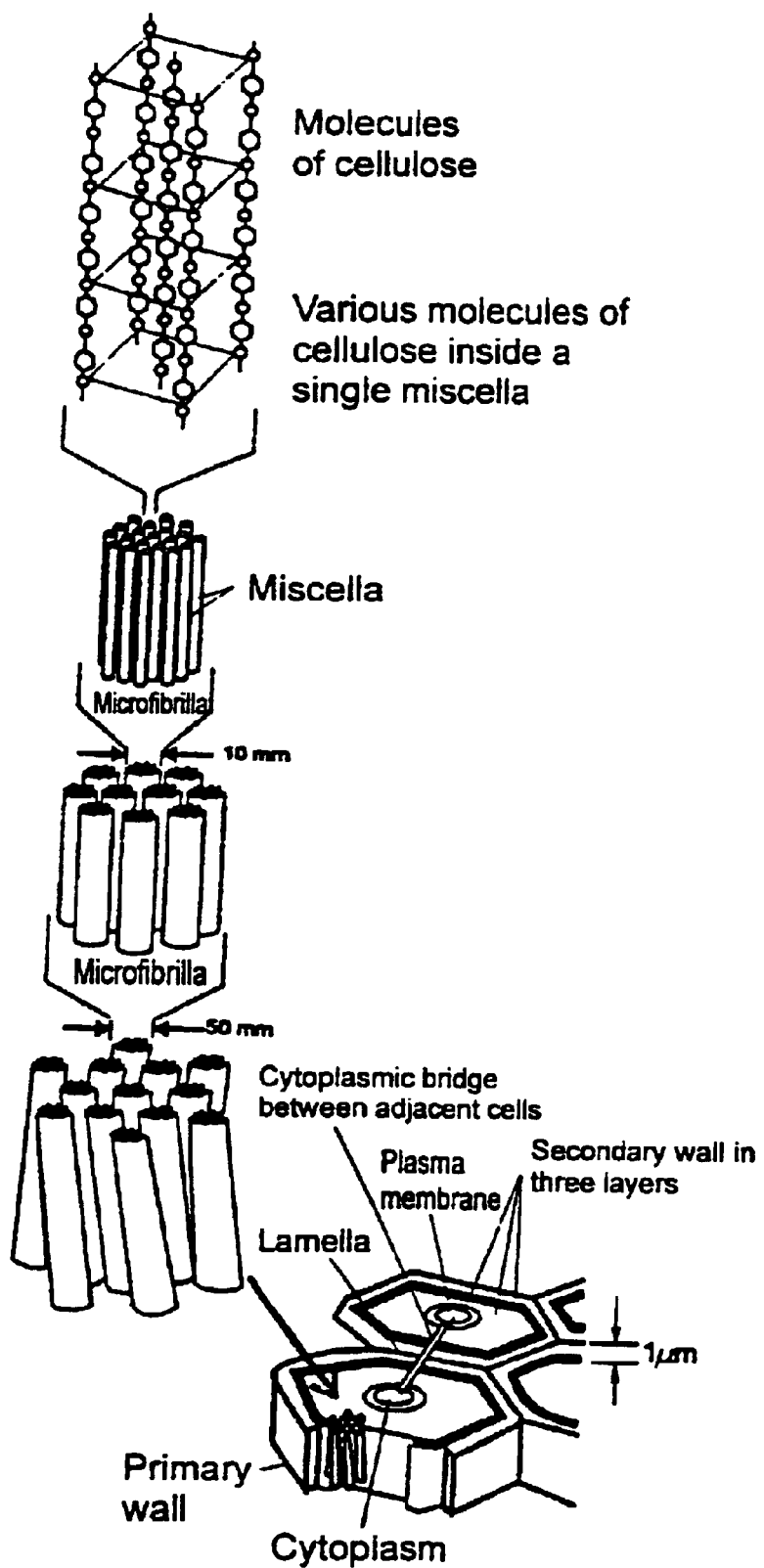
FIG 1  Cellular structure of biomass

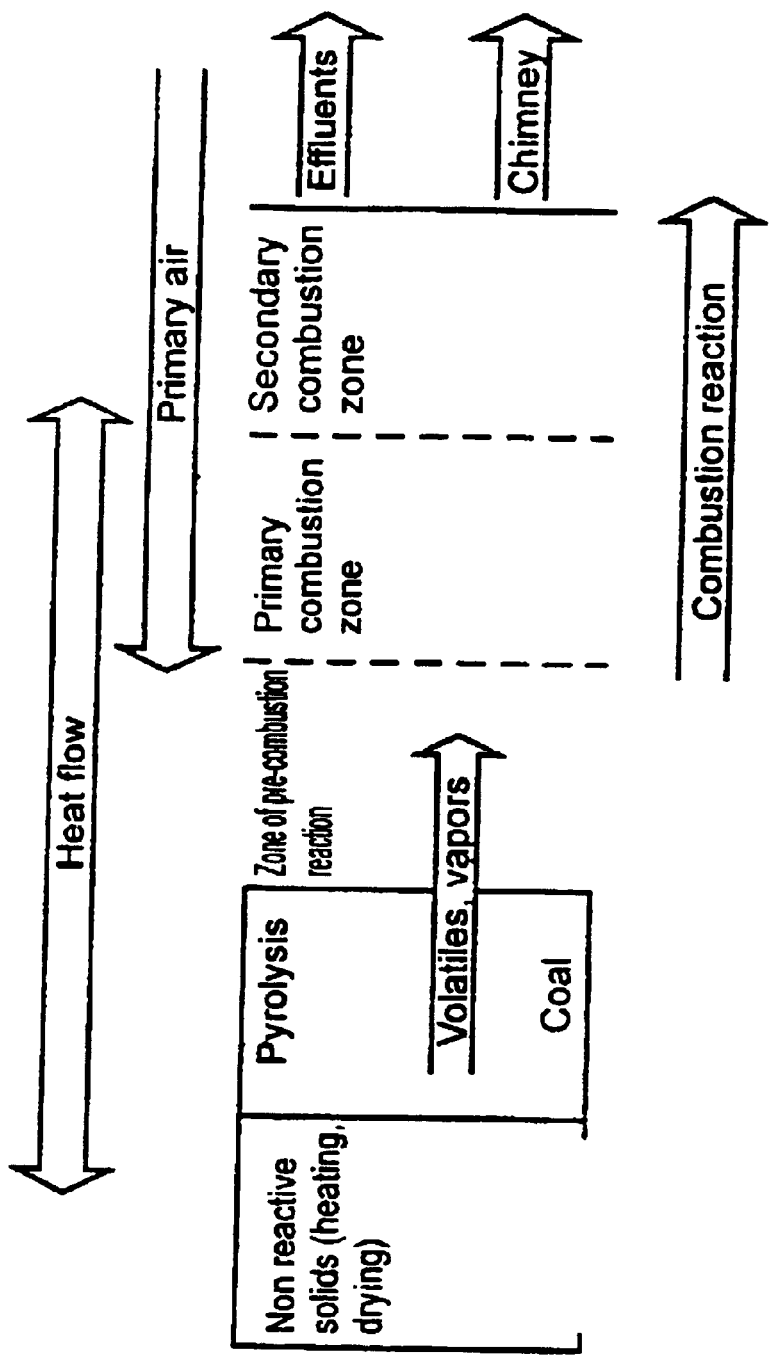
FIG 2  Conceptual model of the combustion of solid fuels.
Complexity of the combustion of wood 1800 X. 1 mm = 370 nm 5000 X. 1 mm = 133 nm 2000 X. 1 mm = 333 nm 20,000 X. 1 mm = 33 nm Diffractiom of X-ray of wood and eucalyptus cellulose Diffractiom of X-ray for cellulignim

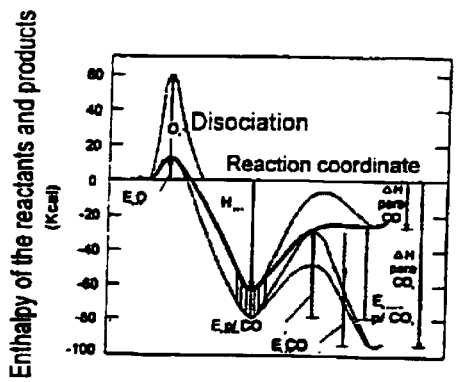
FIG 5 Variation of the Enthalpy of the Reactants and products the coordinate of the Carbon-Oxygen reaction.
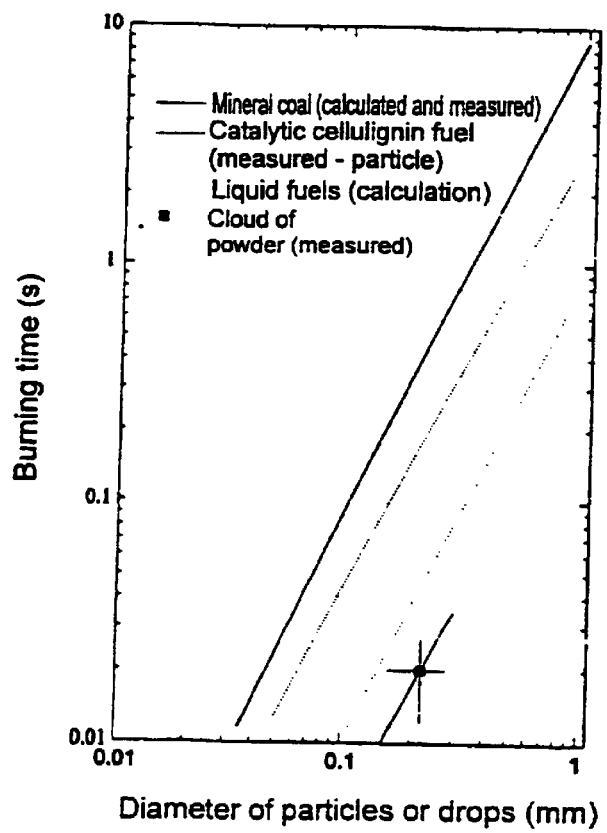
FIG 6 Burning time versus Diameter of particle for mineral coal, catalytic cellulignin fuel, particle and in powder cloud and liquid fuels

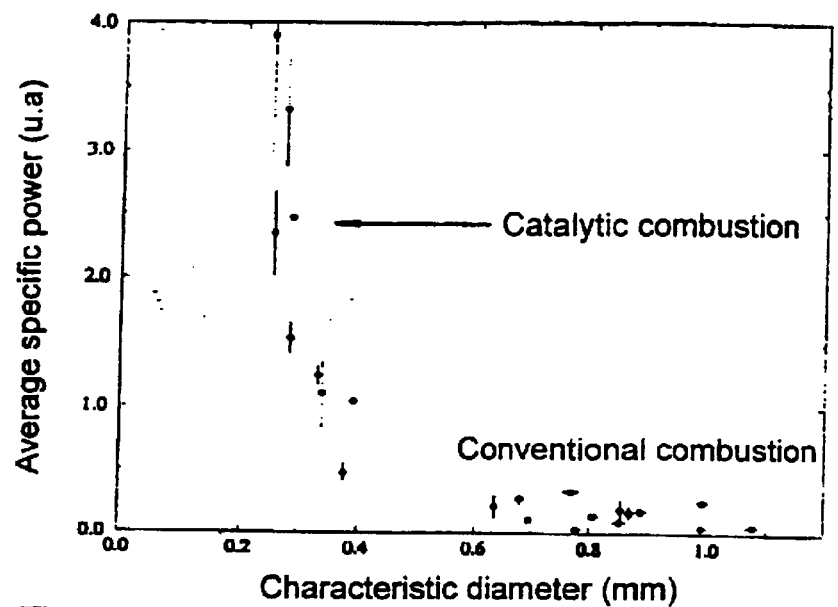
FIG 7a  Average specific power irradiated in the combustion a Catalytic Cellulignin particle (linear scale)
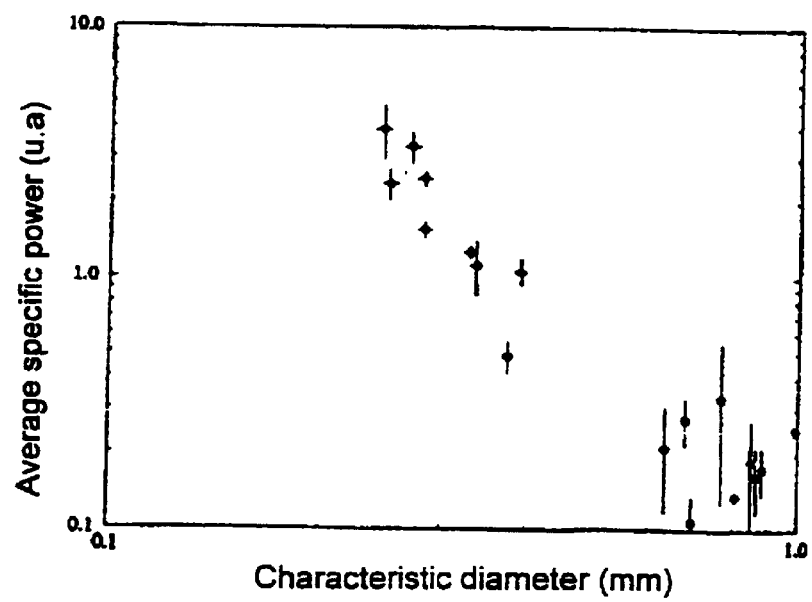
FIG 7b  Average specific power irradiated in the combustion a catalytic cellulignin particle (logarithmic scale)

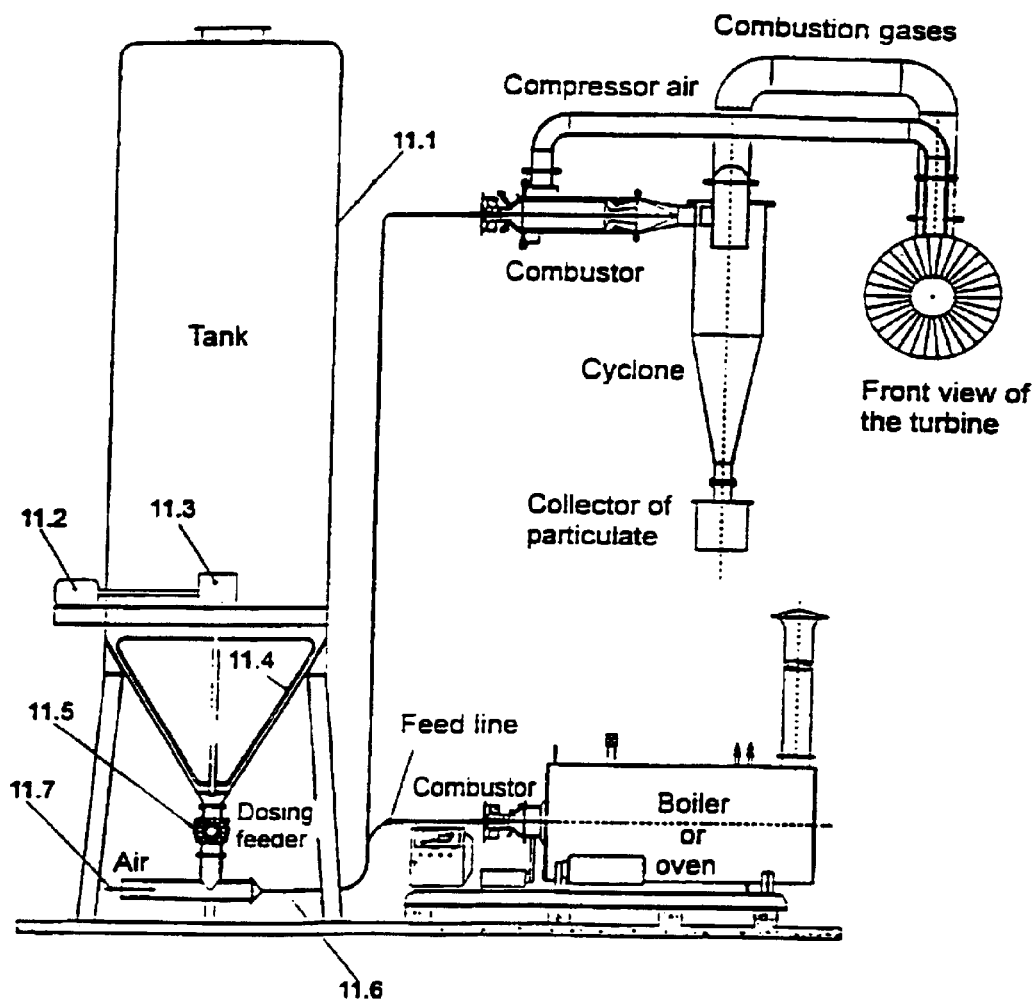
FIG 8 Catalytic Cellulignin feeding system for Boilers/Ovens or gas turbines

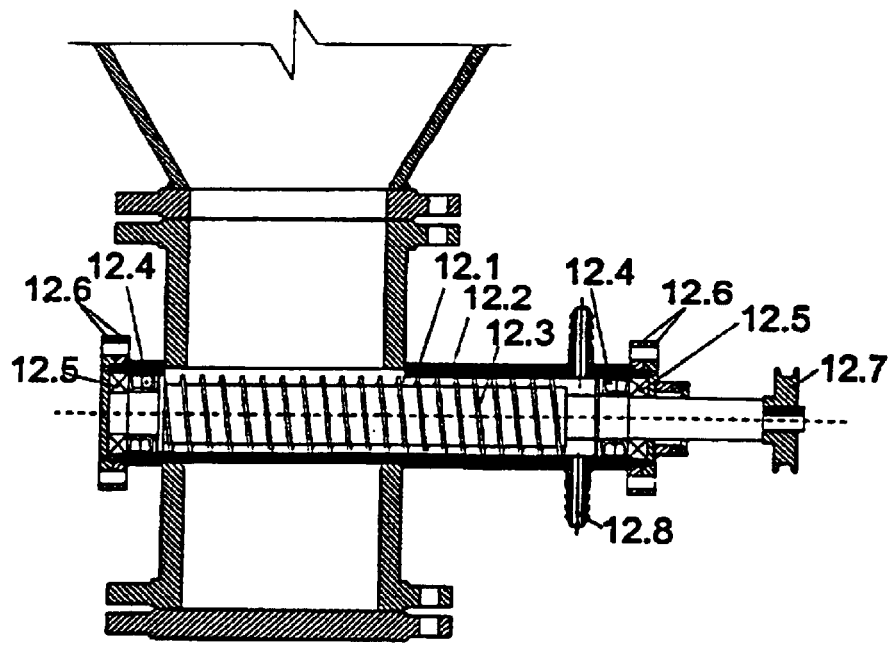
FIG 9  Helical feeder
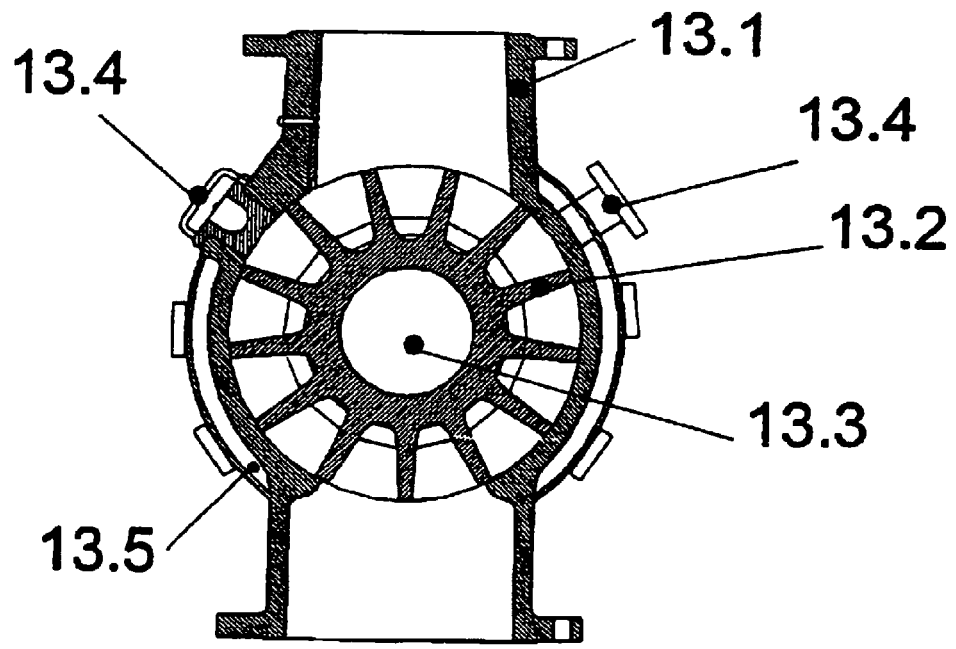
FIG 10  Rotary valve

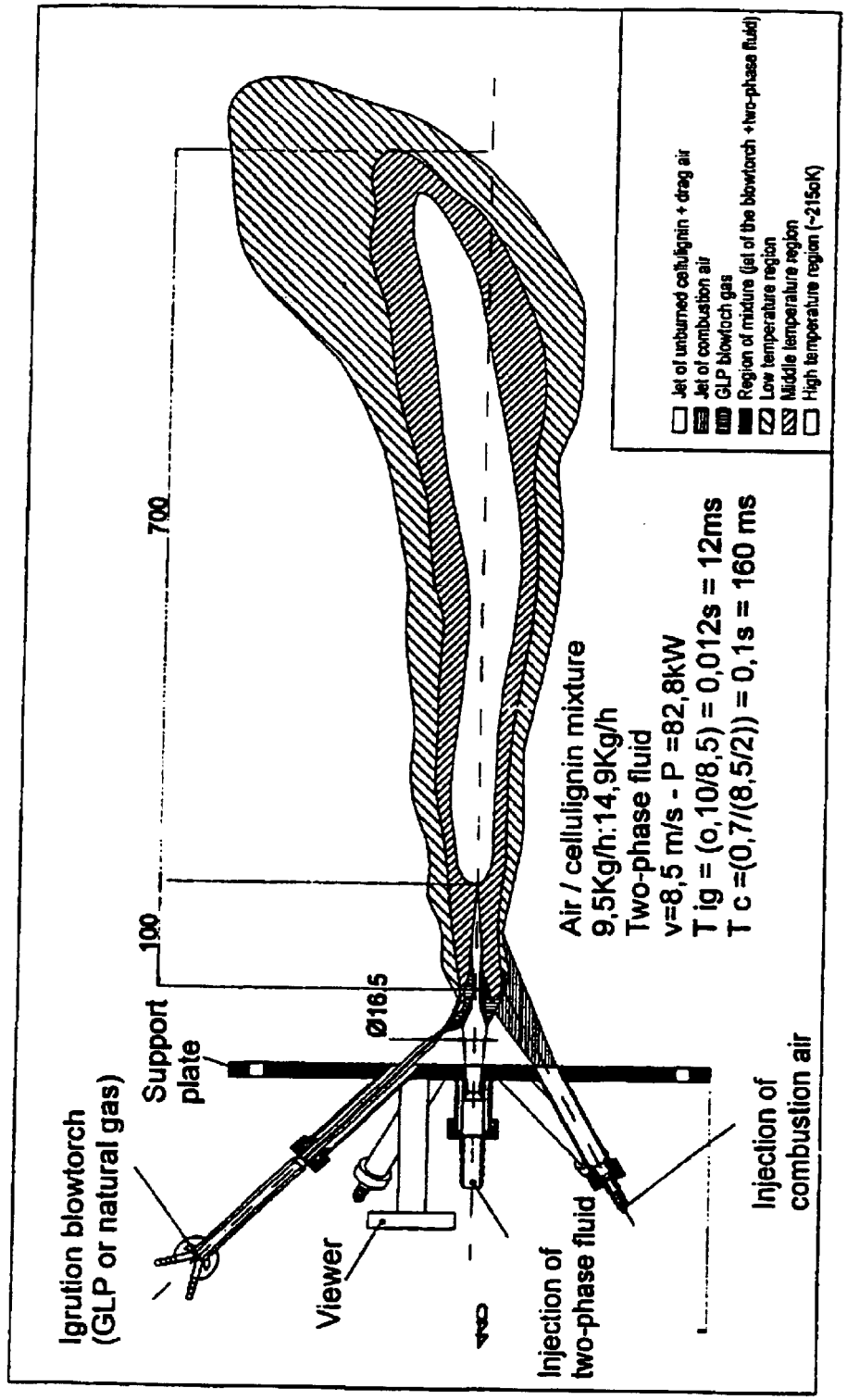
FIG 11 Axial combustor with flame of cellulignin in an open environment

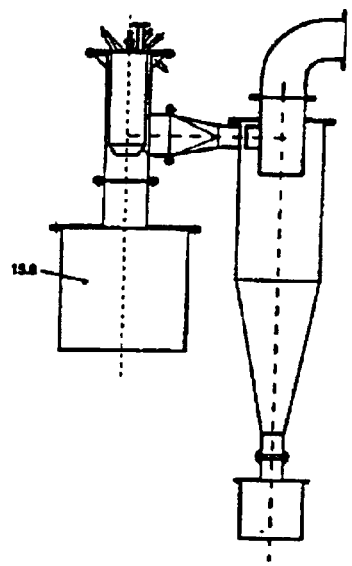
FIG 12a Combustor for cellulignin, cycloning and collection of particulates (horizontal)
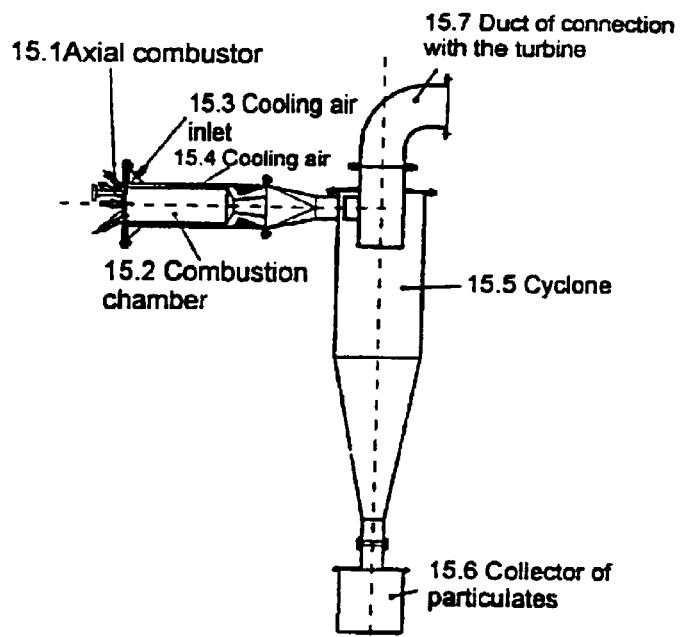
FIG 12b Combustor for cellulignin, cycloning and collection of particulates (vertical)

CATALYTIC CELLULIGNIN FUEL

FIELD OF THE INVENTION

The present invention relates to a new fuel obtained from biomass.

BACKGROUND OF THE INVENTION

The energy obtained from biomass is highly positive from the point of view of energy. For instance, the energetic efficiency of the so-called short-rotation biomass is 89.5%. and the rate of liquid energy is 9.48 times higher. However, in spite of this fantastic energetic efficiency, biomass cannot compete with fossil fuels due to the high costs resulting from the large number of steps required to produce it and also due to the difficulty in handling the raw biomass, which renders it not very practical.

The following points related to the process for producing biomass should be taken into account: 1) planting and cultivation (propagation); 2) expenses with nutrients (fertilization); 3) exposure to the sun; 4) temperature; 5) precipitation; 6) conditions of soil and water, 7) harvesting method; 8) resistance to diseases; 9) competition in the area with production of foodstuffs, pastures and fibers; 10) area availability; 11) transport of the raw biomass.

Biomasses are composed of cellulose, hemicellulose and lignin, the composition position being exemplified in Table 1, and microstructure according to FIG. 1.

TABLE 1

| Cellular wall | Typical Composition - Pine Tree (%) | | |
|---|---|---|---|
| | hemicellulose | cellulose | lignin |
| LM - middle lamella | — | — | 3.0 |
| P - primary wall | 1.4 | 0.7 | 8.4 |
| S - secondary wall | | | |
| S1 | 3.7 | 6.13 | 10.5 |
| S2 | 18.4 | 2.7 | 9.1 |
| S3 | 5.2 | 0.8 | |
| Total | 28.7 | 40.3 | 31.8 |

The cellular walls are composed of macrofibrillae, microfibillae, micelae and cellulose molecules. The nuclei of the cells (cytoplasm) is composed of aqueous solutions. The following formulas represent the approximate estimates of the specific surface (area per unit of mass) of the biomass in the hypothesis of its microstructure being completely released.

1—Geometry with a Square section and length l (S and M: cell surface and cell mass).

$$S = 4bl;\ M = 4ble\rho \therefore \frac{S}{M} = \frac{4bl}{4ble\rho} = \frac{1}{e\rho}$$

broadness of the cell $b = 10\ \mu m$
thickness of the cell wall: $e = 1.0\ \mu m$
$\rho = 1.5\ g/cm^3$
$= 1.5 \times 10^6\ g/m^3$ 2. Specific area of the macrofibrillae, microfibrilla, miscellae and cellulose molecules.

$$S = \pi\phi l;\ M = \frac{\pi\phi^2}{4}l\rho \therefore \frac{S}{M} = \frac{\pi\phi l}{\frac{\pi\phi^2}{4}l\rho} = \frac{4}{\phi\rho}$$

2.a—Specific area of the macrofibrilla ($\phi$=50 nm; Macropores>50 nm)

$$\frac{S}{M} = \frac{4}{50 \times 10^{-9} \times 1.5 \times 10^6} = 53\ m^2/g$$

2.b—Specific area of the microfibrillae ($\phi$=50/4=12.5 nm; Mesopores 2 nm<$\phi$<50 nm)

$$\frac{S}{M} = \frac{4}{12.5 \times 10^{-9} \times 1.5 \times 10^{-6}} = 213\ m^2/g$$

2.c—Specific area of the miscella ($\phi$=(12.5/4)nm=3.1 nm; Micropores $\phi$<2.0 nm)

$$\frac{S}{M} = \frac{4}{3.7 \times 10^{-9} \times 1.5 \times 10^6} = 860\ m^2/g$$

2.d—Specific area of the molecules of cellulose (3.1/6) nm=0.517 nm)

$$\frac{S}{M} = \frac{1}{0.517 \times 10^{-9} \times 1.5 \times 10^6} = 1290\ m^2/g$$

$$N = 1 + 6\sum_0^n ni = 1,\ (1 + 6 = 7),\ (1 + 6 + 12 = 19),$$
$$(1 + 6 + 12 + 18 = 37).$$

The theoretical specific area for the cell is of about 0.7 $m^2/g$, of about 50 $m^2/g$ for the macrofibrillae, of about 200 $m^2/g$ for the microfibrillae, of about 900 $m^2/g$ for the miscealla, and of about 1300 $m^2/g$ for the molecules.

As far as solid fuels are concerned, their conventional combustion comprises 5 zones: first non-reactive solid zone (heating and drying), second reaction zone of condensed phase (solid pyrolysis), third reaction zone of gaseous phase (pyrolysis of gaseous phase and oxidation), fourth primary combustion zone (gaseous phase), fifth post-flame reaction zone (secondary combustion). The specific kinetics and reactions of each zone is not completely known yet.

FIG. 2 illustrates the conceptual model of conventional combustion for wood. Wood is anisotropic and hygroscopic, and its fibers (tracheids) are hollow and have a length of from 3.5 to 7.0 mm in soft wood, and from 1 to 2 mm in hard wood. The linked water is of about 23%, and the total moisture reaches 75%. Cellulose, hemicellulose and lignin behave as polyalcohols wherein the main functional group is the OH group. Cellulose is a linear polysaccharide of anhydrous glucose with 1→4-β glucoside bonds. After oxidation, the functional groups are carbonylic, ketone and carboxylic groups. On the other hand, hemicellulose is a polysaccharide with branched chain, the main components of which are 4-O-methylglucoroxylanes in hard wood and glucomanes in soft wood. The main functional groups thereof are carboxylic, methylic and hydroxylic groups. Lignin, on the other hand, is a tridimensional backbone of 4 or more substituted phenylpropane units. The basic constitutive blocks are guayaquil alcohols (soft wood) and seringyl alcohol (for the two types of wood), and the dominant bonds are β-O-4.

The structures of cellulose and lignin are highly oxygenated and the location of the functional groups is useful in understanding the mechanisms of pyrolysis and oxidation.

For the purpose of comparison, it is observed that the structure of the mineral coal is aromatic, it has few hydroxylic functional groups and β-O-4 bonds. Nitrogen and sulfur are part of the structural rings with little nitrogen existing in the amine form. The fact that the oxygen content is very low in coals when compared with wood is highly significant, since it imparts greater reactivity to the latter.

In the conventional combustion of wood the drying stage involves, in fact, 4 steps, namely 1) energy required for heating the wood up to 100° C. (373° K)=0.08×100×(1−TU) kJ/kg, wherein TU is the moisture content (percentage); 2) energy required for heating water=4.2×100 kJ/kg; 3) energy required for vaporizing the water=2.26 MJ/kg; and 4) energy required for releasing the linked water 15.5×TU kJ/kg (average). The predominant value is the energy from vaporization of water.

The heating stage comprises three factors that have significant influence: the first one is the energy for heating up to the pyrolysis temperature (500–625° K); the wood specific heat is 1113 J/g at 273° K and 1598 J/g at 373° K, while the specific heat of the wood with 35% of moisture is 2.343 J/g at 300° K. Secondly, there is the influence of the moisture preventing the particle core be heated up to the temperature at which water is evaporated and establishing the reaction states. The third factor of influence is the moisture in the increase of the thermal conductivity of the wood particle, which may at most double its value. In addition to its influence on the drying and heating, moisture also causes significant effects on the solid state pyrolysis.

The next stage is the solid pyrolysis step. In this combustion zone, reactions of cleavage of the molecules into gaseous fragment and condensation reactions prevail, whereby coal is produced (tar resulting into 3 final fractions: a gaseous one, a liquid one, and a solid one—coal). The pyrolysis temperatures are: hemicellulose (500–600° K), cellulose (600–650° K) and lignin (500–773° K). Table 2 show the pyrolysis products from cellulose and xylan, with a high tar content that causes a secondary combustion close to the oils for the wood.

TABLE 2

Pyrolysis Products from Cellulose (873° K) and Xylan (773° K)

| Product | Cellulose (% P) | Xyilan (% P) |
|---|---|---|
| Acetaldehyde | 1.5 | 2.4 |
| Acetone Propinaldehyde | 0.0 | 0.3 |
| Furanics | 0.7 | Tr |
| Propenol | 0.8 | 0.0 |
| Methanol | 1.1 | 1.3 |
| 2-Methylfuran | Tr | 0.0 |
| 2,3-Butanedione | 2.0 | Tr |
| 1-Hydroxy-2-Propan glycoxal | 2.8 | 0.4 |
| Acetic acid | 1.0 | 1.5 |
| 2-Furaldehyde | 1.3 | 4.5 |
| 5-Methyl-2-Furaldehyde | 0.5 | 0.0 |
| $CO_2$ | 6.0 | 8.0 |
| $H_2O$ | 11.0 | 7.0 |

TABLE 2-continued

Pyrolysis Products from Cellulose (873° K) and Xylan (773° K)

| Product | Cellulose (% P) | Xyilan (% P) |
|---|---|---|
| Coal | 5.0 | 10.0 |
| Tar | 66.0 | 64.0 |

Tr = trace

The opening of aromatic rings is an intermediate step in forming the volatile material, generating acetic acid and acetaldehyde, which are decomposed by decarboxylation of acetic acid ($CH_3COOH \rightarrow CH_4+CO_2$) and decarbonilation of the acetaldehyde ($CH_3CHO \rightarrow CH_4+CO$). From the hemicellulose, the resulting product is $C_2H_4$ and CO from the propanol. In the next zones, there will be sequence in the pyrolysis and oxidation, giving $CH_4$, $C_2H_4$, CO and $CO_2$ as final products.

The pyrolysis of lignin is different in comparison with the hemicellulose and cellulose and at 823 K it produces the following components: coal (55%), gaseous fraction (45%) composed of CO (50%) CH4 (38%), CO2) 10%) and C2H6 (2%). The tar is composed of phenylacethylene, antracene and naphthalene. Table 3 shows the formation of coal in the pyrolysis of several different materials.

TABLE 3

Coal Formation in the Pyrolysis of Several Different Materials (673 K)

| Material | Coal (% P) |
|---|---|
| Cellulose | 14.9 |
| Poplar (wood) | 21.7 |
| Larch (wood) | 26.7 |
| Aspen (branches) | 37.8 |
| Douglas (bark) | 47.1 |
| Klason Lignin | 59.0 |

Moisture also has a considerable influence on the particle pyrolysis since it causes an enormous difference in temperature between the particle core and the periphery thereof (400° K), creating a physical separation between the heating and drying zone and the pyrolysis zone. The dominant influence of moisture is to reduce the flame temperature of the burner, directing the product to coal formation and reducing the rate of pyrolysis. The theoretical flame temperature of the wood combustion is given by:

$$T_a=1920-(1.51[TU/(1-TU)]\times 100)-5.15\, X_{exAr}$$

wherein Ta (K) is the adiabatic flame temperature, TU is the fraction of the moisture contents, and X exAr is the percentage of air excess. In addition to the reduction of the adiabatic temperature, there is an increase in the air excess, given by:

$$X_{exAr}(\%)=40[TU/(1-TU)]$$

For TU>33%, $T_a=1740°$ K and for TU=50%, $T_a=1560°$ K and consequently there is a decrease in the volatile content and an increase in the coal content. Finally, one should cite that the ashes reduce the local temperature and catalyze the formation of coal.

Next, the pre-combustion reaction occurs, which represent the cleavage of volatile material into fragments of radicals dominated by reactions of initiation of chains of the type:

$$R-R \rightarrow R+R' (368 \text{ kJ/mol})$$

$$R''-H \rightarrow R''+H (410 \text{ kJ/mol})$$

wherein R=$C_2H_6$, $CH_3$, etc. e R''=methylic group.

In wood, the first reaction is most probable due to its lower energy, and an example thereof is given below:

$$C_2H_6+M \rightarrow 2CH_3+M$$

$$2CH_3+2C_2H_6 \rightarrow 2CH_4+2C_2H_5$$

$$M+C_2H_5 \rightarrow H+C_2H_6+M$$

$$H+C_2H_6 \rightarrow H_2+C_2H_5$$

wherein M is a heat (ash or vapor)-removing particle or molecule. If R" contains two or more carbon atoms, the C—C bond is broken preferably instead of the C—H bond. In addition to the reactions of chain initiation, the pre-combustion zone includes reduction reactions with recombinations of radicals R+R'→R-R', especially if the pre-combustion zone is spatially broad. An example thereof is the recombination of nitrogen forming $N_2$ instead of $NO_x$.

After the pre-combustion reactions, primary combustion reactions occur oxygen and fuel mixed in the primary combustion zone results in a number of reactions of free radical, producing $CO_2$ and $H_2O$.

$$RH+O_2 \rightarrow R+HOO$$

$$CH_3+O_2+M \rightarrow CH_3O_2+M$$

$$CH_3O_2 \rightarrow CH_2O+OH$$

HCO and CO ($CH_2O+(1/2)O_2 \rightarrow HCO+OH$ or $CH_2O+O_2 \rightarrow CO+2HO$) are formed from $CH_2O$, and their concentration is maximized at flame temperatures of 1320 K, which is the wood combustion temperature.

Finally, the post-combustion reactions occur: the processes of wood combustion occur at low temperature, and reactions of chain end occur in the secondary combustion. The hydroxyl radical ($CH_2O$) is of great significance when it is present at high concentrations. The main end reactions are:

$$HCO+OH \rightarrow CO+H_2O$$

$$CO+OH \rightarrow CO_2+H$$

$$CO+O_2 \rightarrow CO_2+O$$

the latter being of lesser importance in this zone. The $CO_2$ production from CO is controlled by the OH concentration, which is relatively high for low temperature systems (wood). It follows that the chain end is the recombination of H and OH groups aided by heat-removing species (M). The C:H ratio is relatively high for soft wood (1:1.45) and hard wood (1:1.37) compared with mineral coals (1:017). The wood solid pyrolysis produces water, $CH_4$, $C_2H_4$, and $C_2H_6$, resulting in a substantial amount of hydrogen in the volatile gases to increase the concentration of hydroxyl radical for a complete and rapid oxidation (greater reactivity). There is no complete expressions in the literature for this system, due to the large number of variables associated to the oxidation of the wood volatiles.

In the combustion of (wood) charcoal, the charcoal obtained from the pyrolysis is porous and contains various free radicals for $O_2$ attack. In addition, it contains oxygen and hydrogen, its empirical chemical formula being C6.7H, 3.3O. Three mechanisms were proposed for the charcoal oxidation, it being recognized that the combustion rate is limited by the sites of free radicals on its surface. The charcoal oxidation is also limited by the mass transport. The first mechanism is the Boudouard, as the general indicator of charcoal combustion.

$$C+O_2 \rightarrow 2CO$$

This reaction is highly endothemic with the following reaction constants: $1.1 \times 10^{-2}$ (800° K) and 57.1 (1200°). The CO released is volatile and its combustion is completed in the flame out of the particle. The second mechanism is the chemical adsorption of $O_2$ directly on the coal. The activation energy of the $O_2$ adsorption on the porous surface of the coal ranges from 54 kJ/mole to 10 105 kJ/mol, respectively, for chemically adsorbed quantities from zero to 2.5 moles of $O_2$ per gram of coal. The chemical adsorption reactions are:

$$C^*+O_2 \rightarrow C(O)^* \rightarrow C(O)_m \rightarrow CO+CO_2$$

$$C^*+O_2 \rightarrow CO_{es} \rightarrow CO+CO_2$$

The asterisk indicates an active site of reaction, m stands for moveable species, and es stands for stable species. The charcoal active sites can be generated by the mechanism of pyrolysis. The third mechanism of charcoal oxidation involves reactions of hydroxyl radicals in the active sites given by:

$$2OH+C \rightarrow CO+H_2O$$

$$OH+CO \rightarrow CO+H$$

Hydroxyl radicals are internally generated by homolytic cleavage of the various hydroxylic functional groups existing in the wood or dissociation of the moisture released by the fuel. The moisture influence on the coal oxidation are not well known, as in the case of the pyrolysis of wood. It is speculated that the moisture "deletes" the sites, reducing the rate of coal oxidation. The presence of moisture delays the rate of oxidation of charcoal.

In short, the wood combustion is a multistage process that involves heating and drying, solid state pyrolysis, producing volatile compounds and coal, reactions of gaseous phases (pre-combustion, primary combustion and post-combustion) and combustion of the coal. The various functional groups existing in wood generate a significant number of volatile products from the solid pyrolysis of particles, the various functional groups and the high aliphatic contents increasing the reactivity of wood, contributing to the high proportion of flames in the combustion of the wood with respect to mineral coal. The moisture increases the thermal conductivity, results in greater production of coal in the solid state pyrolysis, increases the concentration of hydroxyl groups for the reactions of gaseous phase and of the coal, and reduces the oxidation rate of the coal, decreasing its temperature and "deleting" the reactive sites.

In view of the complexity and the operational disadvantages presented by the conventional combustion processes, it was desirable to develop a new fuel from biomass that could meet the essential requirements of combustion and overcome the technical drawbacks of the known fuels.

In this regard, various studies have been carried out for the development of new fuels from biomass and some attempts have already presented satisfactory results, as in the case of a cellulignin fuel mentioned in the article "Cellulignin: a new thermoelectric fuel" by Datro G. Pinatti, Christian A. Vieira, Jose A. da Cruz and Rosa A. Conte, which relates to a product from generic cellulignin obtained by a process of pre-hydrolysis of biomass without optimized control. However, it was still desired to obtain a fuel that would present even more advantageous results, mainly from the economic point of view and the applications thereof in the main thermoelectric technologies: ovens, boilers, gas turbines and generation of energy by hydrodynamic magnet (MHD).

Therefore, the objective of the present invention it to provide a new cellulignin fuel with catalytic properties that will meet these market requirements with improved combustion characteristics.

SUMMARY OF THE INVENTION

The present invention relates to a catalytic cellulignin fuel that is composed of cellulose and globulized lignin and that presents a specific surface of about 1.5–2.5 $m^2/g$, with an average value of 2.0 $m^2/g$.

BRIEF DESCRIPTION OF THE DRAWINGS

FIG. 1 shows a schematic diagram of the biomass cellular structure.

FIG. 2 shows the steps of the conventional combustion process of solid fuels.

FIG. 5 shows a graphic of the enthalpy variation for the reactants in a process of catalytic combustion of coal, and FIG. 6 shows ratio of the burning time of mineral coal to the particle size.

FIGS. 7a and 7b in turn shows the power irradiated in the combustion of cellulignin according to the present invention.

FIGS. 8-12b illustrate systems and equipment useful for the combustion of the cellulignin fuel now defined. FIG. 8 illustrates a Catalytic Cellulignin feeding system. FIG. 9 illustrates a helical feeder. FIG. 10 illustrates a rotary valve. FIG. 11 illustrates an axial combustor. FIG. 12a illustrates a horizontal combustor. FIG. 12b illustrates a vertical combustor.

DETAILED DESCRIPTION OF THE INVENTION

After detailed studies, the inventors achieved a catalytic cellulignin fuel obtained from biomass, which allows a surprising result regarding its combustion. The catalytic cellulign fuel of the invention is prepared by a process of pre-hydrolysis of biomass using a reactor such as described in the Brazilian patent application filed on this same date for "An Apparatus and Process of Pre-Hydrolysis of Biomass". The referred-to pre-hydrolysis may be carried out for any type of biomass, such as wood, sugar-cane bagasse and straw, vegetable residues, barks, grass, organic part of garbage, etc.

The pre-hydrolysis process described in the above-mentioned patent application generically comprises steps of discharging the biomass in a helical feeder, in the device of pre-hydrolysis of biomass, followed by a pressurization operation comprising the following steps: 1) filling the device of pre-hydrolysis of biomass with a pre-heated acidic solution; 2) heating; and 3) pressurization, said process being distinguished by the fact that the prehydrolysis is carried out simultaneously with a rotary oscillation of the biomass pre-hydrolysis apparatus, purging of the vapor and controlling the temperature, pressure, acid contents, pre-hydrolysis time, and liquid/solid relationship, monitoring the sugar contents until a value of about 10 Bricks is reached by means of a sugar-measuring device. Then, the steps of discharge of the pre-hydrolyzate into a tank through a heat-exchanger, sugar-recovering washing; and discharge of the cellulignin into mechanical washers or carriages to be washed by percolation are carried out.

Again referring to FIG. 1 and Table 1 presented above, one can see that according to the processes of hydrolysis of biomass the cellulose fibers release is not complete, because the hemicellulose has its highest concentration in the second layer (S2) of its secondary wall. With the pre-hydrolysis process developed by the present inventors, it now has been achieved a product with a specific surface of about 1.5–2.5 $m^2/g$ with an average value of 2 $m^2/g$ measured by BET (Brunace, Emmett and Teller) and a slush number 100, this meaning that this pre-hydrolysis process reaches the level where partial release of the macrofibrille occurs.

Figure 3A:
FIG. 3a shows a microphotograph of the structure of a cellulignin according to the present invention (with an increase of 1000 times).
Figure 3B:
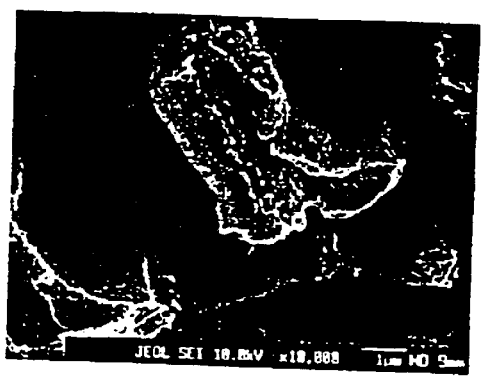
FIG. 3b shows a microphotograph of the structure of a cellulignin according to the present invention (with an increase of 10,000 times).
Figure 3C:
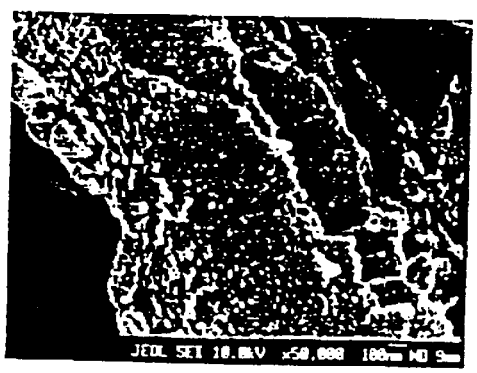
FIG. 3c shows a microphotographs of the structure of a cellulignin according to the present invention (with an increase of 50,000 times).
Figure 3D:
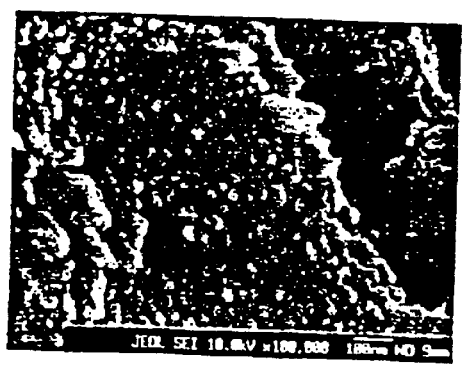
FIG. 3d shows a microphotograph of the structure of a cellulignin according to the present invention (with an increase of 100,000 times).
Figure 3E:
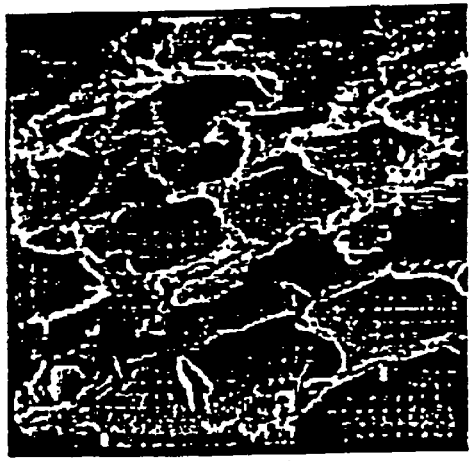
FIG. 3e shows the microstructure of the cellulignin with globlized lignin according to the present invention (370 nm).
Figure 3F:
FIG. 3f shows the microstructure of the cellulignin with globlized lignin according to the present invention (133 nm).
Figure 3G:
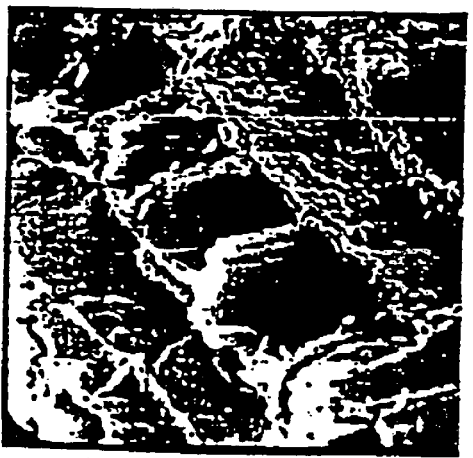
FIG. 3g shows the microstructure of the cellulignin with globlized lignin according to the present invention (333 nm).
Figure 3H:
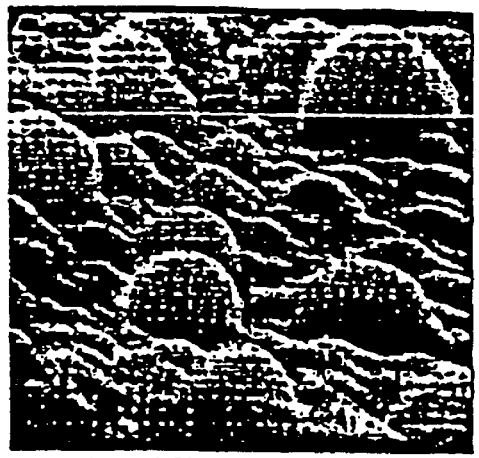
FIG. 3h shows the microstructure of the cellulignin with globlized lignin according to the present invention (33 nm).
Figure 4A:
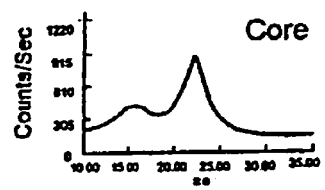
FIG. 4a graphically shows a difratogram of an X-ray for wood and cellulose (Core).
Figure 4B:
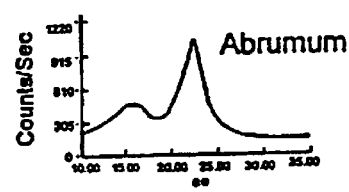
FIG. 4b graphically shows a difratogram of an X-ray for wood and cellulose (Abrumum).
Figure 4C:
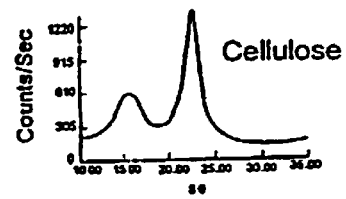
FIG. 4c graphically shows a difratogram of an X-ray for wood and cellulose (Cellulose).
Figure 4D:
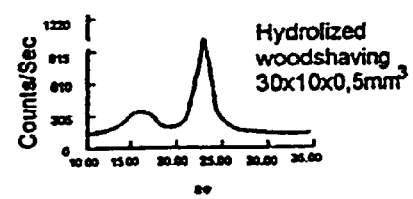
FIG. 4d graphically shows a difratogram of an X-ray for cellulignin hydrolyzed in woodshaving.
Figure 4E:
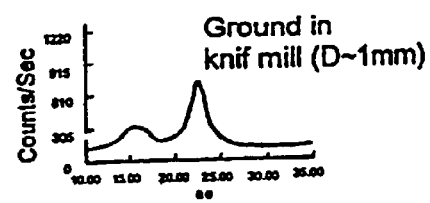
FIG. 4e graphically shows a difratogram of an X-ray for cellulignin ground in knif mill.
Figure 4F:
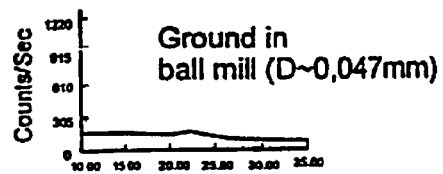
FIG. 4f graphically shows a difratogram of an X-ray for cellulignin ground in ball mill.

The confirmation of this macrofibrillae release is illustrated in the microphotographs presented in FIGS. 3a-3e. FIG. 3a shows the microstructure of the catalytic celllignin according to the invention after pre-hydrolysis, with an increase of 1000 times (scale of 10 $\mu$m). FIG. 3b shows a cellular wall presenting the middle lamella with an increase of 10,000 times (scale 1 $\mu$m), while FIG. 3c shows the cellular wall with an increase of 50,000 times (scale 100 nm)

and FIG. 3d shows the cellular wall with an increase of 100,000 (scale of 10 μm). FIG. 3e shows the microstructure of a second sample where it is possible to observe the lignin globulization.

The combination of an open structure, while maintaining the crystalline characteristics of cellulose demonstrated by X-rays diffraction, as can be seen in FIG. 4, enables one to achieve the following characteristics of the cellulignin fuel:

1—due to the maintenance of the cellulose crystalline characteristics, it is possible to effect the grinding of the cellulignin according to the present invention down to below 200 μm by using hammer mills without the need for intermediate sieving and with a low energy consumption (about 12 kWh/t). Due to this characteristic, the new fuel is called "catalytic" lignin.

2—Easy drying of the water in rotary dryers, ovens or cyclones: the cellulignin according to the invention, which has particle size below 200 μm, presents a completely open structure which permits it to be dried at 500 ppm of moisture and at low temperature, that is to say, at 125° C. (temperature of chimney gas).

The water contained in biomass is one of the worst characteristics for combustion and the drying achieved for the cellulignin of the invention allows the obtention of a value of $18^A$ 20 MJ/kg for the combustion heat, which is the double of the combustion heat of biomass with normal moisture of 45%.

Therefore, one of the great technical advantages obtained by the present invention is that the catalytic cellulignin may be externally dried with the heat of the chimney gas and subsequently burned in dry form. This option is unfeasible for raw wood.

3—When in the powder form, the cellulignin density is of 600 kg/m3 in the so-called accommodated form, and 450 kg/m3 in the non-accommodated form. This represents an average energetic density of 20 MJ/kg×500 kg/m3=104 MJ/m3, compared with the energetic density of 40 MJ/kg× 800 kg/m3=3.2×10⁴ MJ/m3 for fuel oils, which means that the tanking and handling of the catalytic cellulignin fuel are only three times as high as those of fuel oils, and it is drastically easier than the handling of raw biomasses (wood and vegetable residues), which require large volumes and huge equipment.

4—The dosage of the cellulignin of the invention in combustion apparatus is made, for instance, by means of helical dosing device or rotary valves and the feeding of air such as drag-gas air in the proportion of air:cellulignin of about 3.28:1 by weight and 1261.6:1 by volume. This imparts to the cellulignin a characteristic equal to that of the gases or liquids in the operations of dosing and feeding, providing a drastically easier operation than the conventional dosing and feeding of solid fuels, especially biomasses.

5—The microstructures pictures show the disclosure of the microfibrillae in a dimension of 50 nm. This technique establishes the correlation between the process (hemicellulose digestion) and the product (open structure with medium specific surface). It constitutes one of the main new characteristics of the product, as well as the technology of controlling the pre-hydrolysis process in the production of the catalytic cellulignin fuel.

6—Table 4a illustrates the physical characteristics of the Micropores (Active Sites) and table 4b presents the distribution of the Meso and Macropores. The former was determined by BET—Adsorption of N2 and the latter was determined by Hg porosimetry. The total specific area measured by BET is about 2.20 m²/g, and the specific area of the macro and meso pores were the larger portion of the total area. The calculation thereof from the average radius of the pore measured by Hg porosimetry results in 1.80 m²/g, admitting a cylindrical symmetry of the pore (I=2r). This conclusion is coherent with the low micropores volume ($1.1 \times 10^{-3}$ cm³/g) measured by BET. The distribution of the macro and meso pores has its maximum value ranging from 1 to 5 μm (1000–5000 nm), this size coinciding with the voids of the of the cells photographed by MEV (FIGS. 3a, 3b, and 3e). The data of table 4 and the microstructures of MEV permit the complete characterization of the catalytic cellulignin fuel according to the present invention. The micropores are measured by the iodine number equal to 100; in the case of the catalytic cellulignin still there is no instrumentation that enables one to appraise the of the micropores (2 nm) contribution in the combustion.

TABLE 4a

Physical characterization of the Micropores (Active Sites - ϕ < 2.0 nm)

| Samples | Crystalline density[1] (g/cm³) | Specific area[2] (m²/g) | Micropore Radius[2] (nm) | Micropore volume[2] (×10⁻³ cm3/g) |
|---|---|---|---|---|
| 1 - Wood | 1.284 | 0.459 | 0.948 | 0.217 |
| 2 - Cellulignin without grinding - pre-hydrolysis time | | | | |
| 2a - 0.5 h (oscilation) | 1.331 | 0.756 | 0.980 | 0.371 |
| 2b - 1.0 h (oscilation) | 1.337 | 1.463 | 0.905 | 0.662 |
| 2c - 1.0 h (static) | 1.334 | 1.342 | 0.970 | 0.651 |
| 2d - 2.0 h (oscilation) | 1.351 | 2.249 | 0.964 | 1.080 |
| 3 - Griding effect | | | | |
| 3a - cellulignin without grinding | 1.252 | 2.483 | 1.197 | 1.496 |
| 3b - 297 μm < ϕ < 354 μm | 1.353 | 2.758 | 0.997 | 1.375 |
| 3c - 177 μm < ϕ < 210 μm | 1.368 | 2.013 | 1.135 | 1.143 |
| 3d - 125 μm < ϕ < 149 μm | 1.375 | 2.114 | 1.032 | 1.090 |
| 3e - 88 μm < ϕ < 105 μm | 1.372 | 1.915 | 0.962 | 0.921 |
| 3f - ϕ < 74 μm | 1.346 | 3.179 | 0.914 | 1.454 |
| 4 - Wood and carbonized Cellulignin | | | | |
| 4a - carbonized wood | 1.314 | 0.965 | 1.024 | 0.494 |
| 4b - cellulignin de 0.5 h | 1.292 | 2.474 | 1.014 | 1.254 |
| 4c - cellulignin de 1.0 h | 1.327 | 1.452 | 1.002 | 0.727 |
| 4d - cellulignin de 2.0 h | 1.371 | 1.932 | 1.009 | 0.974 |
| 4e - double carbonization | 1.421 | 2.497 | 1.000 | 1.248 |

[1]Picnometry of Helium; Equip. used: Ultrapicnometer - Model: 1000 from Quantachrome - Version: 1.62
[2]BET - Adsorption of N2; Equip. used: Adsorptometer - Model: Nova from Quantachrome - Version 3.70

TABLE 4b

Distribution of Meso (2 nm < 0 < 50 nm) and Macro (0 > 50 nm) pores (cm³/g)

| Samples | Average radius (nm) | Porosimetry of Mercury $D_P$ Pore Diameter (nm) | | | | | | Cylindrical Geometri of the Pore (r = 21) $(S/V) = (2\pi r^2 + \pi rl)/(\pi r^2 l)$ |
|---|---|---|---|---|---|---|---|---|
| | | $D_P < 10$ | $10 < D_P < 100$ | $100 < D_P < 1000$ | $10^3 \times D_P < 2 \times 10^3$ | $2 \times 10^3 < D_P < 5 \times 10^3$ | Total | $(S/V) = (2/r)$ $S = 2 V/r\ M^3/g$ |
| 3a-cellulignin without grinding | 631.2 | 0.018 | 0.076 | 0.233 | 0.038 | 0.056 | 0.421 | 2.668 |
| 0 > 2 mm | 1025.2 | 0.004 | 0.022 | 0.084 | 0.039 | 0.048 | 0.197 | 0.768 |
| 0 > 354 μm | | | | | | | | |
| 3b-287 μm < 0 < 354 μm | 893.0 | 0.006 | 0.033 | 0.095 | 0.052 | 0.046 | 0.232 | 2.080 |
| 210 μm < 0 < 250 μm | 987.2 | 0.009 | 0.027 | 0.084 | 0.048 | 0.051 | 0.219 | 1.755 |
| 3c-177 μm < 0 < 210 μm | — | — | — | — | — | — | — | — |
| 149 μm < 0 < 177 μm | 845.8 | 0.003 | 0.018 | 0.094 | 0.082 | 0.035 | 0.212 | 2.004 |
| 3d-125 μm < 0 < 149 μm | — | — | — | — | — | — | — | — |
| 105 μm < 0 < 125 μm | 1180.6 | 0.007 | 0.025 | 0.090 | 0.058 | 0.049 | 0.229 | 1.553 |
| 3e-88 μm < 0 < 105 μm | — | — | — | — | — | — | — | — |
| 74 μm < 0 < 88 μm | 1003.2 | 0.009 | 0.025 | 0.091 | 0.051 | 0.042 | 0.218 | 1739 |
| 3e- | — | 0.008 | 0.023 | 0.108 | 0.163 | 0.530 | 0.830 | 3.676 |
| 0 < 74 μm | 1715.4 | | | | | | | |

S = Surface of the pore
V = Volume of the pore
r = Radius of the pore
l = Length of the pore 7—The major application of the cellulignin of the present invention is as a fuel for boilers, gas turbine and for the generation of energy by magnet hydrodynamics (MHD). However, apart from the uses as a fuel, there are several other applications in the following areas: a volume component for animals food, pyrolysis for the production of oils and activated coal, production of carbon black (incomplete combustion), production of methanol, cellulignin resinates (agglomerates, MDF—Medium Density Fiber), substrate for semisolid fermentation (fungi, bacteria and enzymes), etc.

Even though the precise chemical formula of the cellulignin according to the invention may vary. its empirical chemical formula is presented in Table 5, in comparison with the empirical formulas of wood, biomass components, mineral coal and fuel oils, these data providing a good reference for the understanding of the improved effects achieved by the fuel developed now.

TABLE 5

Chemical formulas of the several fuels

| Fuel (moisture) | Material Volatile (%) | Carbon fixed (%) | Ashes (%) | Empirical formula approximate |
|---|---|---|---|---|
| 1. Soft wood (46%): | | | | |
| Douglas fir | 86.2 | 13.7 | 0.1 | $C_{4.4}H_{6.3}O_{2.5}N_{tr}$ |
| Pitch pine | — | — | — | $C_{4.9}H_{7.2}O_{2.0}N_{tr}$ |
| Hemlock | 84.8 | 15.0 | 0.2 | $C_{4.2}H_{6.4}O_{2.8}N_{tr}$ |
| 2. Hard wood (32%): | | | | |
| Poplar | — | — | — | $C_{4.3}H_{6.3}O_{2.6}N_{tr}$ |
| White ash | — | — | — | $C_{4.1}H_{7.0}O_{2.7}N_{tr}$ |
| 3. Barks: | | | | |
| Oak | — | — | — | $C_{3.3}H_{5.4}O_{3.1}N_{tr}$ |
| Pine | — | — | — | $C_{4.5}H_{5.6}O_{2.4}N_{tr}$ |

TABLE 5-continued

Chemical formulas of the several fuels

| Fuel (moisture) | Material Volatile (%) | Carbon fixed (%) | Ashes (%) | Empirical formula approximate |
|---|---|---|---|---|
| 4. Wood | | | | |
| Dry (17%) | — | — | — | $C_{4.4}H_{5.0}O_{2.4}N_{0.02}(H_2O)_{1.1}$ |
| Humid (50%) | — | — | — | $C_{4.4}H_{5.0}O_{2.4}N_{0.002}(H_2O)_{5.6}$ |
| 5. Components of biomass: | | | | |
| Cellulose | | | | $(C_6H_{10}O_5)_n$ |
| Hemicellulose | | | | $(C_5H_{10}O_5)_n$ |
| Lignin | | | | $(C_{10}H_7O_4)_n$ |
| Catalytic cellulignin | | | | $C_{5.5}H_{4.2}O_{1.8}N_{tr}$ |
| Cellulose coal | | | | $C_{6.7}H_{3.3}O_{1.0}N_{tr}$ |
| 6. Tar: | | | | $C_{4.7}H_{5.8}O_{3.0}N_{tr}$ |
| 7. Mineral coals: | | | | |
| Lignite (37%) Sub-bitumenous | | | | |
| A(14%) | — | — | — | — |
| B(25%) | 40.7 | 54.4 | 4.9 | $C_{8.0}H_{4.8}O_{1.0}N_{tr}$ |
| C(31%) | — | — | — | — |
| Bitumenous | | | | |
| Low volatile | 17.7 | 71.9 | 10.4 | $C_{6.7}H_{4.3}O_{0.14}N_{0.11}$ |
| Medium volatile | — | — | — | — |
| High volatile | 6.4 | 81.4 | 12.2 | $C_{6.8}H_{2.3}O_{0.12}N_{0.09}$ |
| Antracitic | 6.4 | 81.4 | 12.2 | $C_{6.8}H_{2.3}O_{0.12}N_{0.06}$ |
| 8. Oils (APF - A1) | — | — | — | $C_{7.3}H_{11.1}O_{0.09}N_{0.02}$ |

As can be seen, biomasses have low carbon contents (4.3 moles per formula-gram), middle hydrogen contents (6.5 moles per formula-gram), and high oxygen contents (6.5 moles per formula-gram). Mineral coals have high carbon contents (6.5 moles per formula-gram), low hydrogen contents (4.3 moles per formula-gram), and low oxygen contents (0.15 moles per formula-gram). The catalytic cellulignin according to the invention is in an intermediate position with carbon (5.5) and hydrogen (4.2) contents tending to mineral coal, but with intermediate oxygen contents (1.8 moles per formula-gram). In fact, the catalytic cellulignin comes close to lignite coal being obtained, however, in 20 minutes of pre-hydrolysis, while lignite coal took millions of years to be formed.

Another great advantage of the cellulignin fuel developed now is its very tow ashes contents, thus meeting, for instance, the requirements of clean fuel for gas turbine (Na+<5 ppm) when processed in pre-hydrolysis with deionized water. This is due to the pre-hydrolysis process efficiency that solubilizes K in the form of water-soluble $K_2SO_4$, which is later leached in the washing step. All impurities contained in the wood are reduced and even those of higher contents, such as Ca, Mg, al, and Si present in eucalyptus wood, for example, do not cause hot corrosion on the superalloys of the gas turbines. The cycloning of the combustion gases from the fuel of the invention proved to be highly efficient in reducing the ashes contents at the level required for gas turbines (total particulate <200 ppm and particulate with a diameter >5 $\mu$m being in a proportion lower than 8 ppm).

A few points should also be stressed with respect to the improved characteristics of the cellulignin fuel of the present invention, which bring expressive advantages for combustion processes, when compared to conventional fuels.

As already mentioned before, in the solid pyrlysis zone in a combustion process, high temperatures favor the production of volatile compounds, and low temperatures favor the production of coal. As already indicated by table 2 above, the products resulting from the cellulose and xylan pyrolysis result in high tar contents, which causes a secondary combustion close to the oils for wood. However, there is no xylan in the catalytic cellullignin according to the present invention, which leads to lower coal contents in this zone. It is further pointed out that the globulization of lignin in the production process of catalytic cellulignin fuel of the invention favors the formation of volatiles and decreases the coal contents. In addition, and considering the influence of moisture on the particle pyrolysis, it follows that the catalytic cellulignin fuel maximizes the combustion temperature, increases the volatile contents and decreases the formation of coal contents since provides the possibility of a burning without moisture and with low ashes contents.

Other technical advantages obtained according to the invention may be clearly observed during the pre-combustion reactions and in the primary combustion reactions, as well as in the post-combustion reactions of the cellulignin fuel.

In the pre-combustion step, it is observed that, in the case of the catalytic cellulignin, there is a decrease in the ash contents, the water contents and xylans are non-existent, and these aspects favor $CH_4$ formation (a product from the decomposition of R"-cellulose) instead of $C_2H_6$ (product from the decomposition of hemicellulose, non-existent in cellulignin). During the primary combustion, the combustion of cellulignin takes place at higher temperatures, like the combustion of $CH_4$ resulting from the decarboxilation of the acetic acid and decarbonilation of the acetaldehyde resulting from the opening of the rings. This explains why, in practice, the catalytic cellulignin has a combustion similar to that of natural gas and of volatile liquid fuels. Finally, during the post-combustion step the ratio C:H is of 1:0.76 for the case of the catalytic cellulignin, that is to say, it is closer to the mineral coals than to wood. The average oxygen contents, however, favor the formation of $CH_4$, $CO_2$ and CO, reinforcing the explanation for the high reactivity of the catalytic cellulignin.

In order to enable a better understanding of the similarity of the features of combustion of the catalytic cellulignin of the present invention as compared with those of the mineral coal, a modern theory of the combustion of porous particles (Essenhigh) is given below in view of its significance for the invention of the combustion of cellulignin.

The mass loss rate: m=m(a,σ) wherein m=mass of the spherical particle, a=particle radius, d=2a=particle diameter, σ=particle density and m=(4/3)πa³σ.

$$\frac{dm}{dt} = \frac{\partial m}{\partial a}\frac{da}{dt} + \frac{\partial m}{\partial \sigma}\frac{d\sigma}{dt}$$

$$\frac{dm}{dt} = 4\pi a^2 \sigma \frac{da}{dt} + \frac{4}{3}\pi a^3 \frac{d\sigma}{dt}$$

$$R_s = \frac{dm/dt}{4\pi a^2} = \sigma \frac{da}{dt} + \frac{a}{3}\frac{d\sigma}{dt} = R_s + R_i = R_s\left[1 + \frac{R_i}{R_s}\right]$$

$$\frac{R_i}{R_s} = \frac{a}{3\sigma}\frac{d\sigma}{da} = \frac{1}{3}\frac{d(\ln\sigma)}{d(\ln a)}$$

$R_s$=mass loss rate by the external surface of the particle (g/cm²s) e $R_i$ is the mass loss rate by the internal surface. The above equation is an inexact differential equation impossible of being integrated due to the lack of a relationship between σ and the a (integration way).

Essenhigh (1988) proposed the utilization of the equation of Thiele (1939) of catalysis as a way of integration of $R_s$ $$\frac{\sigma}{\sigma_0} = \left(\frac{d}{d_0}\right)^\alpha = \left(\frac{a}{a_0}\right)^\alpha \therefore a = \frac{d(\ln\sigma)}{d(\ln a)}$$

wherein α=0 stands for density, σ constant with combustion by the external surface and α→∞ stands for constant diameter with combustion over the internal surface (This concept is similar to the catalysis over the external surface or over the internal surface).

Calculating the $R_r/R_e$ relationship it follows that:

$$\frac{R_i}{R_s} = \frac{R_i}{R_m}\frac{R_{im}}{R_s} = \eta\frac{R_{im}}{R_s}$$

wherein $R_{tm}$ is the maximum rate of internal loss and η=$R_r/R_{tm}$ is the Thiele effectiveness factor (0<η<1) representing the relationship between the real internal loss and the maximum possible internal loss (For large particles or particles of low porosity, the internal mass loss is negligible and η→0 while for small particles and high density the internal loss of mass is maximum and η=1).

Defining $S_v$ as the internal surface area per volume unit $V_p$ ((cm²/cm³)=1/cm) and $S_p$ as the external surface area of the particle, it follows that the relationship $R_{tm}/R_e$ is proportional to the relation of the internal and external areas in:

$$\frac{R_{im}}{R_s} = \frac{V_p S_v}{S_p} = \frac{\frac{4}{3}\pi a^3 S_v}{4\pi a^2} = \frac{aS_v}{3}$$

$$\frac{R_i}{R_s} = \frac{a}{3}S_v\eta = \frac{1}{3}\frac{d(\ln\sigma)}{d(\ln a)} = \frac{\alpha}{3}$$

$$\alpha = aS_v\eta$$

For mineral coals, α ranges from zero to 3, exceptionally reaching the value of 6. For the catalytic cellulignin fuel, we have $S_v = \sigma S_g$ wherein $S_g$ is the internal surface per unit of mass, the following values resulting for a particle of 200 μm:

| $S_g$ | m²/g | 0.01 | 0.1 | 0.2 | 0.3 | 0.4 | 0.5 | 1.0 | 10.0 |
|---|---|---|---|---|---|---|---|---|---|
| | m²/kg | 10 | 10² | 2 × 10² | 3 × 10² | 4 × 10² | 5 × 10² | 10³ | 10⁴ |
| $\alpha = a\sigma S_g\eta$ | | 1 | 10 | 20 | 30 | 40 | 50 | 100 | 1000 |
| $(\sigma/\sigma_0) = (d/d_0)_\alpha$ | | 0.9 | 0.349 | 0.122 | 0.042 | 0.015 | 0.005 | 2.7 × 10⁻⁵ | 1.7 × 10⁻⁴⁸ |
| $p/(d/d_0) = 0.9$ | | | | | | | | | |

This means that for a specific surface larger than 0.4 m2/g (α=40), the catalytic cellulignin fuel burns mainly from the internal surface, maintaining the particle diameter approximately constant and varying its density (burning of a fractal–1$^a$ zone), characterizing the new invention as a large-scale, completely catalytic, fuel obtained from the pre-hydrolysis of biomass available in nature. Tests of specific surface (BET, porosimetry of mercury and MEV) indicate an average value of 2.0 m2/g, resulting in a α=200. The particles of liquid fuel bum from the external surface (α=0–3$^a$ zone), and the particles of mineral coal have partial internal combustion (0=or <α=or <3–2$^a$ zone).

For the case of mineral coal, α=Sv/γ, wherein γ is the Thyele parameter given by:

$$\lambda = (S_v\overline{\kappa}/\rho D_e)^{1/2};\ \alpha = (\rho D_e S_v/\overline{\kappa})^{1/2}$$

wherein k=constant of the reaction rate, ρ=reactive gas density and De=coefficient of internal diffusion. For the catalytic cellulignin there is no need for independent determination of these parameters, because they combine, resulting in a relatively high value of α(α=or >100).

In the catalytic combustion, the oxygen does the direct attack on the carbon atom as a two-stage reaction (adsorpotion-desorption), illustrated in FIG. 5. Oxygen is adsorbed and desorbed, forming $CO_2$ or CO, which is then deadsorbed.

The components and products of the reaction are C, $O_2$, $CO_2$, $H_2O$, $H_2$, and CO, according $$2C_f + O_2 \xrightarrow{k_1} 2C(O)$$

$$C_f + CO_2 \underset{k_2}{\overset{k_1}{\rightleftarrows}} C(O) + CO$$

$$C_f + H_2O \underset{-k_3}{\overset{k_3}{\rightleftarrows}} C(O) + H_2$$

$$2C_f + H_2 \underset{-k_4}{\overset{k_4}{\rightleftarrows}} 2C(H)$$

$$C(O) \xrightarrow{k_5} CO + C_f$$

$$2C(O) \xrightarrow{k_5} CO_2 + C_f$$

to the following reactions:

wherein Cf indicates a free site, C(O) stands for a chemically adsorbed oxygen atom and ki are reaction constants. The volatiles (CO, $H_2$) produced by the catalytic combustion complete their combustion outside the particle with a very short combustion time (3 ms). The determined combustion time is that of the adsorption-deadsorption process, being equal to or shorter than 20 ms (0.02 s) for the catalytic cellulignin.

The burning time for mineral coal, liquids (oils) and for catalytic cellulignin fuel measured in the form of isolated particle and in the form of powder cloud is illustrated in FIG. 6 and the formulas utilized in the corresponding calculations are presented below.

Attachment I: Combustion Times
1a—Coal Cumbustion
Burning Time
  i) at constant density:

$$t_b = \frac{\rho_0 R T_m}{96\phi D p_g}d_0^2$$

ii) at constant diameter $$t_b = \frac{\rho_0 R T_m}{144\phi D p_g}d_0^2$$

wherein:
  $\rho_0$=initial density of the particle≅1000 kg/m³
  R=universal constant of the gases=0.8106 m3 atm/(kmolK)
  $T_m$=average temperature=1600 K
  D=diffusion coefficient=3.49×10⁻⁴ m²/s
  $P_g$=partial oxygen pressure=0.2 atm
  φ=order of reaction=2
  $d_0$=initial particle diameter (m)
1b—Combustion of Liquids
Burning Time $$t_b = \frac{d_0^2}{\lambda}$$

wherein:
  $d_0$=initial diameter
  λ=evaporation rate=(10±2)×10⁻³ cm²/s for hydrocarbons burning in air.
  In the first form, the burning time is shorter than that of mineral coal because it is a much more reactive fuel. In the form of a powder "cloud", there is a decrease in the thermal losses due to the energy transmission by radiation among the particles, decreasing the burning time for values similar to those of the volatile liquids. One way of analyzing this question is by means of the Krishna and Berlad's energy balance for ignition of powder cloud of mineral coal.

$$(const)T_i^{\beta-1} = \frac{\lambda_0/a}{1+R^2D/a^2\sigma}$$

wherein the first term is the energy generation rate, a is the radius of the particle, R is the radius of the cloud, ρ is the particle density, D is the density of the cloud, $\lambda_0$ is the air thermal conductivity and β is an empirical coefficient. If $R^2D/a^2\sigma<<1$ it follows that a $T_i\beta^{-1}$=(const.) and if $R^2D/a^2\sigma>>1$, then $T_i\beta^{-1}$=(const)a. The latter is in accordance with the world experience that recommends grinding the mineral coal at temperatures not higher than 70° C. to avoid incineration of the powder cloud in the mills. For catalytic cellulignin fuel injection, we have R=0.1 m. a=100×10$^{-6}$ m, σ=500 kg/m³. D=0.4 kg/m³ resulting in $R^2D/a^2\sigma$=800>>1. The smaller the particle size, the lower the ignition temperature of the powder cloud. For mineral coal, the theoretical ignition temperature of the cloud is 300 at 500° C. and for catalytic cellulignin, the ignition temperature is on the order of 350° C. (pyrolysis temperature). The presence of oxygen in the molecule of the catalytic cellulignin fuel favors the similarity of its combustion process to that of mineral coal (however, with higher reactivity and higher ignition temperature) with respect to the combustion of wood, which is of five steps and seriously limited by the presence of water.

In order to establish the combustion characteristics, catalytic cellulignin particles of different diameters were burned by means of LASER ray ignition and determination of irradiation intensity with photodiodes. The results are shown in FIGS. 7a and 7b, where one can see two regimes, namely: 1) above 250 μm the combustion is of the conventional type (limited by the transport of mass inwards and outside the particle) and 2) below 251° μm the combustion is not limited by mass flow (process of adsorption of $O_2$—deadsorption of CO). The two regimes adjust to Thiele's catalytic combustion. Attention is drawn to the importance of maintaining the crystalline characteristic of the cellulose in the prehydrolysis process to render the grinding of cellulignin particles smaller than 250 μm inexpensive.

a) Conventional combustion (ϕ>250 μm): the catalytic cellulignin is dried outside the combustion equipment and the drying zone is non-existent. The heating is rapid, the generation of volatiles is maximized while coal generation is minimized. The catalytic cellulignin does not contain xilan, its solid pyrolysis predominating, that is to say, opening of the ring with production of acetic acid, acetaldehyde and coal by decarbonilation of the acetic acid and decarboxylation of the acetaldehyde in the formation of $CH_4$, $CO_2$ and CO. The zones of volatiles primary and secondary combustion are the same as described before.

b) Catalytic combustion (ϕ<250 μm): The pre-hydrolysis displaces the biomass in the direction of the combustion of mineral coal. The main characteristic is that combustion is no more limited by the mechanism of the oxygen transport into the catalytic cellulignin and of CO therefrom due to the particle microstructure. In this way, there is physical ($O_2$) and chemical (O) adsorption in active sites and Boudouard's reaction is favored. Reactions of hydroxylic groups cause rapid reactions in the heating and solid pyrolysis zones. The catalytic combustion occurs in the average internal surface (2.0 m²/g), the contribution of the external surface (0.1 m²/g) of the particle being secondary. The framework of the catalytic cellulignin is that of a fractal that burns while maintaining the diameter of the particle approximately constant and decreasing the particle density. When the wall of the fractal thickness reaches a critical size, a collapse of the particle (sublimation) takes place. Therefore, the process eliminates the formation of residual coal, resulting in complete combustion.

The combustion equipment usable for the catalytic cellulignin of the present invention will depend upon the type of specific combustion to be employed. In this regard, the main methods of biomass combustion are: combustion in pile, thrower-spreader, suspension, and fluidized bed, the thrower-spreader combustor is the most prominent from the industrial point of view. The characteristic of the first two is the complete physical separation of the five combustion zones. In the combustion by suspension of dry biomass particle (ϕ<2 mm, TU <15%), all "zones" take place in the middle of the air, in a sequential way. The suspension burning is the closest to the burning of liquid fuels. This is the case of the cellulignin proposed now, which comes close to the combustion of gases and liquids due to its catalytic combustion.

The combustion in fluidized bed maintains the fuel in a bed with sand or lime suspended by air. All the reaction zones take place in the same place (not separable physically). The combustion efficiency is low due to the excess air (100–140%) necessary to maintain the fluidized bed, and the temperature is kept below the ashes melting point in order not to cause the bed to collapse. In the case of the catalytic cellulignin of the invention, the suspension combustion may be carried out with stoichiometric air and without limitation of temperature, since it has a very low ash content. The three main parameters in the combustion are useful heat, thermal efficiency and combustion temperature.

$$Hv=CCS-PT; \eta=[1-(PT/CCS)]\times100$$

wherein CCS is the upper calorific capacity and PT are the thermal chimney losses, ashes (including not-burnt carbon), radiation and others. The chimney losses are given by:

$$PT = \sum_{i=1}^{n} m_1(Cp_1\Delta T) + m_{H_2O}\lambda_{H_2O}$$

wherein mi is the moles of the chimney gases ($CO_2$, $O_2$, $N_2$, $H_2O$), Cpi is the calorific capacity of each species, ΔT is the difference in temperature between the chimney and the environment $m_{H2O}$ is the number of moles of water and $\lambda_{H2O}$ is the molar water vaporization value.

The losses by radiation are of about 4% and other losses (ash, not-burnt carbon) are about 2%. The combustion efficiency of a wood with 50% moisture is 68%; with 17% moisture, it is 79%, and that of the catalytic cellulignin is 85% (close to the values of the mineral coal) due to the absence of moisture, ash and excess air. The catalytic cellulignin fuel of the invention permits the achievement of temperatures close to the adiabatic one (1920 K), although the temperatures of the vapor-generating tubes of the boilers are limited to 840 K.

The heat release rates for the different combustion methods are given by I=h dW/dt, wherein I is the flame intensity, dW/dt is the change in weight in function of the time, and h is the combustion heat. Table 6 shows several rates for the different combustion methods:

TABLE 6

Heat release rates for different combustion methods.

| Combustion method | Wood | Mineral coal |
|---|---|---|
| Combustion in pile | 8.5 GJ/m²h | |
| Inclined grid | 3.5 GJ/m²h | |
| Thrower-spreader | 10.4 GJ/m²h | 8.8 GJ/m²h |
| Suspension | 550 GJ/m³h | |
| Fluid bed | 470 GJ/m³h | |

The reactivity of the catalytic cellulignin is slightly higher than that of biomass (absence of water, larger specific surface) and the combustion heat is the double, leading to a heat release rate twice as high as that of wood. For example, 9 kg/h of catalytic cellulignin with combustion heat of 20 MJ/jg burn in suspension in a volume of $\phi=2$ cm and L=50 cm, that is, $(9\times20/(\pi\times(0.01)^2\times0.5)=1.146$ GJ/m³h.

The examples of equipment given below will better illustrate the present invention in a better way. However, the data and procedures illustrated merely refer to a few embodiments of the present invention and should not be taken as being limitative of the scope of the invention.

The complete characterization of the catalytic cellulignin fuel involves elements of the cellulignin as starting material, of the combustion specific characteristics and of the fuel handling and controlling equipments.

FIG. 8 illustrates a feeding system composed of a cellulignin tank (8.1), a rotary valve or helical feeder for dosing the cellulignin feed (8.5 and FIGS. 9 and 10), feeding line of the air/cellulignin two-phase fluid (rate 3.28:1 by weight) (8.6) and applications in boilers and ovens (pressure close to the atmospheric one, T=1900° C.), in gas turbines (pressure of 7–14 atm, T=600–1100° C.). The cellulignin tank may be either stationary (preferably in vertical cylindrical form), or moveable (installed in carriage similar to the tanks for carrying animal food or cement). Due to the tendency of cellulignin to settle, the tanks are preferably provided with a conic or plane bottom and with powder handlers of the rotary-shovel type (8.2, 8.3, 8.4), helical feeders or a bottom with moveable compressed-air lining. At the exit of the rotary valve or helical feeder for dosing the cellulignin, drag air is injected for two-phase flow at the ratio of 3.28:1. The two-phase flow may be made of metallic, plastic pipes or hoses, the air/cellulignin mixture behaving as if it were a gas or a liquid. Under low pressure. the energetic density of the air/cellulignin mixture is of 7.14 MJ/m3, while that of natural gas is 32.9 MJ/m3 and that of the fuel oils is 28.0 MJ/m3, permitting still compact, simple installations and significant lengths of the piping, in order to meet the layouts of the factories, thermoelectric power stations, etc.

The helical feeder shown in FIG. 9 is composed of a body (9.1), bushing (9.2), helical feeder (9.3), powder retainer (9.4), bearings (9.5), flanges (9.6). driving pulley (9.7) and air injection for two-phase flow (9.8). The dosage of cellulignin is carried out by turning the helical feeder and varying its diameter and, in general, it is utilized for low capacities (<150 kg/h). The elimination of the influence of pressure difference between the cellulignin tank and the drag gas in dosing the powder carried by the helical feeder is carried out by means of the impedance of the length of the helical feeder between the tank body and the drag air of the two-phase flow. The rotary valves illustrated in FIG. 10 are available on the market for capacities higher than 150 kg/h and comprise a body (10.1), shovels (10.2), driving shaft (10.3), inspection window (10.4) and possibly cooling (10.5). The dosage is made by means of rotation, the diameter and the length of the valves.

Combustors

The direct use of combustors in boilers and ovens is possible because of the low content of the cellulignin ashes (<0.2%) and the resources already existing in this equipment for removing residual ashes. For applications in gas turbines, the following measures are necessary: a) combustion chamber with injection of primary air (stoichiometric combustion) and secondary air (drag of the ashes from the combustion chamber to the cyclone and cooling of the combustion gases down to the working temperature of the turbine); b) gas-cleaning cyclone (removal of the particulate); and c) possible ceramic filter for high temperature turbines (1100° C.—monocrystalline superalloys), and these filters are indispensable to polycrystalline superalloys or with directional solidification. The specifications of Na+K<5 ppm, in the catalytic cellulignin fuel with total particulate contents of 200 ppm, with diameter >5 μm lesser than 8 ppm in the combustion gases, have been achieved without the need for ceramic filters.

Axial Combustor

FIG. 11 shows an example of an axial combustor to characterize the combustion of the catalytic cellulignin. The ignition may be carried out in several ways, such as by microblowtorches of GLP, natural gas, etc., electric arc, electric resistance or hot gas tube. The fact that it is easy, automation and low cost favor the ignition with blowtorches of GLP, natural gas (consumption of 0.022 kg of GLP/kg of cellulignin, representing 5% of the calorific capacity of the combustor). Two factors related to catalytic cellulignin ignition are pointed out: first, the need for it to be heated up to the pyrolysis temperature (350° C.); second, the operational security of the catalytic cellulignin with respect to the combustible gases and liquids that ignites at room temperature. The practical applications may be made with any type of combustor (axial, swirler, cyclonic, etc.)

The axial combustor is composed of a mounting plate (11.1) with or without cooling, cellulignin injector (11.2), stoichimetric-combustion-air injector (11.3), fixture of the ignition blowtorches (11.4) with or without cooling, ignition blowtorch of GLP, natural gas, etc. (11.5), window with view-finder (11.6). Ignition blowtorches are as small as available on the market, because the catalytic characteristics of cellulignin enable their instantaneous ignition and propagation for the two-phase air/cellulignin flow. The power of the ignition blowtorch is on the order of 5% of the power for low capacity (50 kW) combustors and tends to negligible percentages for high capacity combustors. For the two-phase flow with velocity of 8.5 m/s and a diameter $\phi=16.5$ mm, the ignition spreads at a length of 100 mm, giving an ignition time of 0.012 s=12 ms. The combustion is complete at a length of 0.7 m, giving a residence time of 1/(8.5/2)=0.16 s=160 ms (one has utilized the average velocity of 8.5/2= 4.25 m/s, since the injection velocity in the beginning of the flame is of 8.5 m/s and the velocity at the end of the flame is virtually nil). The resistance-time/ignition-time relationship is on the order of ten times. The ignition times of the catalytic cellulignin tend to the ignition times of gases, which are on the order of 3 ms.

In general, mineral coal and liquid fuels generate a very long flame length, due to the longer burning times (see FIG. 6). thus requiring combustors of the axial-swirler type for reducing the flame length. The catalytic characteristic of cellulignin allows one to use axial combustors with relatively short flame lengths. The extinguishing of the ignition blowtorch results in extinguishing the flame of the catalytic cellulignin, due to the need for it to be pyroliyzed at 35° C., imparting to the catalytic cellulignin complete security in its handling (non-incendiary and non-explosive fuel) The catalytic cellulignin does not contain hemicellulose, which is responsible for the incendiary characteristic of biomasses in the form of straws (pyrolysis temperature=200° C.), as well as it does not pyrolyze at low temperature, and so does not have the incendiary characteristics of the gases and liquid fuels (low flash point). On the other hand, above 350° C., its combustion is catalytic with ignition times close to that of gases.

Gas Turbines

For applications of cellulignin combustors in gas turbines, two additional steps are required, namely: cooling of the gases and a cyclone for reducing particulates. FIGS. 12a and 12b show the cellulignin combustor, cycloning and particulate collector with horizontal or vertical assembly. It is composed of combustor (12.1), combustion chamber (12.2), inlet of cooling air (12.3), chamber of cooling air (12.4), homogenization sector (12.5), cyclone (12.6), particulate collector (12.7), and duct of connection with the turbine (12.8). In the vertical position, an ash collector (12.9) is added before the combustion gases are directed to the cyclone for collection of the molten ashes during the stoichiometric combustion.

The combustor illustrated is manufactured from stainless steel, except for the combustion chamber, which is made from superalloys due to the high temperatures (1920° K), being cooled by the cooling air. A portion of the cooling air penetrates the bores in the wall of the combustion chamber, creating a peripheral layer of drag air for dragging the molten ashes and particulates.

One of the main characteristics of the gas turbines is their versatility with regard to fuels, operating with gases such as natural gas, evaporated oils and process gases (refineries, blast-furnaces and gasifiers); liquids such as clean liquids that are volatile Naphthas, light distillates (Diesel, kerosene) and viscous and heavy residual oils; and solids. Liquid fuels with high ash contents (crude and residual oils) require cleaning equipment prior to their utilization.

Table 7 illustrates the properties of the three types of conventional fuels and of the catalytic cellulignin. The latter is placed between the natural gas and light distillates (clean fuels) and the mixtures of heavy distillates and low-ash crude oil. It does not contain $V_2O_5$, $WO_3$, $MO_3$, or Pb, and the S content is very low. The Na+K for the clean catalytic cellulignin concentration is close to that of the clean fuels while for normal catalytic cellulignin it is dose to that of heavy residual high-ash crude oils (table 8). The prehydrolysis carried out with deionized water is an effective technology of producing the clean catalytic cellulignin as a fuel for gas turbines. The only parameter out the conditions of clean fuel is the total ash contents (<0.1%). These are, however, significantly reduced in the cyclone, reaching total particulate contents <200 ppm, and contents lower than 8 ppm for particles with size bigger than 5 μm.

Natural gas distillates do not need a fuel treatment. Mixtures of heavy distillates, low-ash crude oils and especially heavy residual high-ash crudes need washing of the fuel that is based on the water-solubility of sodium, potassium, and calcium. There are four conventional washing processes, namely: centrifuge, D.C. electric, A.C. electric, and hybrid. The catalytic cellulignin dispenses with any washing process that has been used for reducing the Na+K contents from 100 ppm down to levels of from 5 to 0.5 ppm in crude and residual oils.

TABLE 7

Properties of the Fuels

| Properties | Distillates and Naphtha | | | | Catalytic Cellulignin | | Mixtures if Distillates a Low Ash Crudes | | | High Ash Crude and Heavy Residues |
| --- | --- | --- | --- | --- | --- | --- | --- | --- | --- | --- |
| | Kerosene | #2 | Oil #2 | JP-4 | Clean | Normal | Low Ash crude | Typical Crude from Libia | Heavy Distillates | |
| Flash Point (° C.) | 54/71 | 48/104 | 66/93 | <T.A. (1) | 350 (2) | 350 (2) | 10/93 | — | 92 | 79/129 |
| Flow Point (° C.) | −45 | −48/−12 | −23/−1 | — | Any (3) | Any (3) | −9/43 | 20 | — | −9/35 |
| Visc. CS to 38° C. | 1.4/2.2 | 2.48 2.67 | 2.0/4.0 | 0.79 | (4) | (4) | 2/100 | 7.3 | 6.20 | 100/1800 |
| SSU | — | 34.4 | — | — | — | — | — | — | — | — |
| Grau API | — | 38.1 | 35.0 | 53.2 | — | — | — | — | — | — |
| Secof Desn. at 38° C. | 0.78/0.83 | 0.85 | 0.82/0.88 | 0.7545 (5) | 0.50 | 0.50 | 0.80/0.92 | 0.84 | 0.8786 | 0.92/1.05 |
| Calorific Power MJ/kg | 44.6/45.5 | 42.3 | 43.9/45.3 | 20.0 | | 20.0 | 43.9/44.8 | 42.2 | 42.1 | 42.3/43.7 |
| Ashes | 1 a 5 | 0.001 | 0 a 20 | — | 1000 | 2000 | 20 a 200 | 36 | — | 100/1000 |
| Coal Residues | 0.01/01 | 0.104 | 0.03/0.3 | — | | | 0.3/3 | 2/10 | — | — |
| Sulfur (%) | 0.01/0.1 | 0.164 a 0.293 | 0.1/0.8 | 0.047 | <80 ppm | 280 ppm | 0.1/2.7 | 0.15 | 1.075 | 0.5/0.4 |
| Hydrogen | 12.8/14.5 | 12.83 | 12.0/13.2 | 14.75 | 4.3 | 4.3 | 12.0/13.2 | — | 12.40 | 10.0/12.5 |
| Na + K (ppm) | 0/1.5 | — | 0/1.0 | — | 5 | <60 | 0/50 | 2.2/4.5 | — | 1/350 |
| Vanadium | 0/0.1 | — | 0/0.1 | — | Zero | Zero | 0/15 | 0/1.0 | — | 5/400 |
| Lead | 0/0.5 | — | 0/1.0 | — | Zero | Zero | — | — | — | 0/25.0 |
| Calcium | 0/1.0 | 0/2.0 | 0/2.0 | — | <500 | 500 | — | — | — | 0/50 |

TABLE 7-continued

Properties of the Fuels

| Properties | Distillates and Naphtha | Catalytic Cellulignin | Mixtures of Distillates and Low Pressure Crude | High Ash Crude and Heavy Residues |
|---|---|---|---|---|
| Preheating of the fuel | No | No | Yes | Yes |
| Atomization | Mechanics/Low Pressure Air | No | Low Pressure/High Pressure Air | High Pressure Air |
| Disalination | No | No | Some | Yes |
| Inhibitor | No | No (Limited) | Limited | Always |
| Washing of the Turbine | No | No | Yes (except for distillate) | Yes |
| Initial Fuel | With Naphtha | Ignition (GLP, natural gas, heated tubes, electric resistance) | Some Fuels | Always |
| Cost | Higher | Intermediate | Intermediate | Lower |
| Description | Low-quality Distillate free of ashes | Porous powder with limited ash contents, that can be reduced by cyclones | Low Ash, Limited Level of Contaminants | High Ash Low Volatility |
| Designation ASTM | 1GT, 2GT, 3GT | (3-GT) | 3GT | 4GT |
| Turbine Inlet Temperature | Higher | Intermediate | Intermediate | Low |

TABLE 8

Inorganic impurities (mg/g) of Eucalyptus, Catalytic Cellulignin and Pre-hydrolysate

| | Ca | K | Na | Mg | P | Al | Si | Mn | Fe | Zn | S |
|---|---|---|---|---|---|---|---|---|---|---|---|
| Eucalipto | 560 | 400 | <140 | 160 | 170 | 50 | <120 | 20 | 10 | ND | 140 |
| Celulignina normal (1) | 500 | <60 | <140 | <40 | 10 | <40 | <120 | <4 | <10 | <6 | <80 |
| Celulignina limpa (2) | <53 | <5 | <1 | <60 | <2 | <40 | <120 | <2 | <7 | <4 | <80 |
| Pre-hidrolisado (3) | 260 | 370 | 80 | 140 | 65 | 10 | 25 | 20 | 8 | 5 | 1950 |

(1) cellulignin processed with filtered tap water, with X-rays semi-qualitative analysis
(2) cellulignin processed with deionized, with X-rays semi-qualitative analysis except for K (by ICP/AES) and Na (AAS-flame)
(3) mass balance not carried out due to the absence of initial water and washing water analysis.

For gas turbines, specifications of the fuel level are usually made. In the case of catalytic cellulignin, due to the purification of the cyclones coupled to the combustor outside the turbine, the specifications should be made at the level of the combustion gases or in terms of an "equivalent fuel".

The influence of the (Na+K) contents (ppm) on the working temperature of the Iconel superalloy 718 is given by:

| (Na + K) ppm | 0.33 | 2.28 | 3.70 | 4.89 | 5.65 |
|---|---|---|---|---|---|
| Temperature (° C.) | 927 | 871 | 815 | 760 | 704 |

The catalytic cellulignin fuel allows operation in the range of 800 to 830° C. Coatings are utilized in order to increase the resistance of the superalloys to hot corrosion. Table 8 shows the main types of coating obtained by diffusion (Al, Pt, Rh, NiCrSi) and by overlayers (Co, Cr, Al, Y). Various techniques of depositing the overlayers are utilized, namely: plasma spray, sputtering, deposition of vapor by electronic beam (PVD) and cladding. At present, the hot-corrosion resistances are limited by the coatings and not by the base-metals of the rotors and stators of the turbines.

The protection with plasma or EB/PVD, however, enables one to achieve 16000 h of operation, even under aggressive conditions.

The main requirements for a gas turbine fuel are: calorific power, cleanliness, corrosivity, deposition/obstruction and availability. The fuel from clean catalytic cellulignin obtained by pre-hydrolysis from biomass with deionized water meets all the above requirements.

TABLE 9

Protecting Layers (coatings) of the Turbines

| Specification of the Protection | Element in the Layer | Deposit technique | Typical applications | Capacity in hours; Combustion chamber (870° C.) |
|---|---|---|---|---|
| UC | Al | PC | Co Base stators of | |
| 870 | Al, Si | PC | Base parts Ni | |
| RT-5 | Al, Cr | DPC | Ni Base stators | |
| RT-17 | Al, Ni | DPC | Nickel doped with Thorium | |
| RT-19 | Al | DPC | Co Base stators (High temperature service) | |
| RT-21 | Pt, Al | PC | Ni stators and rotors | 800 |
| RT-22 | Rh, Al | EP/PC | Ni base rotors | 5000 |
| BB | Pt, Rh, Al | EP/PC | Ni and Co Base stators and rotors | |

TABLE 9-continued

Protecting Layers (coatings) of the Turbines

| Specification of the Protection | Element in the Layer | Deposit technique | Typical applications | Capacity in hours; Combustion chamber (870° C.) |
|---|---|---|---|---|
| RT-44 | Co, Cr, Al, Y | EB/PVD | Co Base stators | |
| Overlayers | Ni, Co, Cr, Al | EB/PVD | Overlayers for various services | 7000 (plasma) 14000 (composed plasma) 18000 (clad) |

PC—Pack Cementation; DPC—Double Pack Cementation;
EP—Eletroplating; EB—Electron Beam; PVD—Physical Vapor Deposition

What is claimed is:

1. A catalytic cellulignin fuel, characterized in that it is composed of cellulose and globulized lignin with specific surface of about 1.5–2.5 m$^2$/g wherein the catalytic cellulignin fuel has an empirical formula of $C_{5.5}H_{4.2}O_{1.8}N_{tr}$ and a crystalline density range from 1.252 to 1.375 g/cm$^3$.

2. A catalytic cellulignin fuel according to claim 1, characterized in that it is composed of cellulose and globulized lignin with an average specific surface of about 2 m$^2$/g.

3. A cellulignin fuel according to claim 1, characterized in that it has a heat combustion value of about 18 to 20 MJ/kg.

4. A cellulignin fuel according to claim 1, characterized in that it is ground into particles having size lower than 250 mm.

5. A cellulignin fuel according to claim 1, characterized in that it presents an ignition time equal to or shorter than 20 ms (0.02 s).

6. A cellulignin fuel according to claim 1, characterized in that it has a volatilization temperature of about 350° C.

7. A cellulignin fuel according to claim 1, characterized by a Na+K content lower then or equal to 5 ppm.

8. A cellulignin fuel according to claim 1, characterized in that it generates combustion gases with total particulates lower than 200 ppm, the particles having diameter lower than 5 nm at concentrations lower than 8 ppm.

* * * * *